US011373335B2

(12) United States Patent
Ikeda

(10) Patent No.: US 11,373,335 B2
(45) Date of Patent: Jun. 28, 2022

(54) CAMERA PARAMETER ESTIMATION DEVICE, METHOD AND PROGRAM

(71) Applicant: NEC CORPORATION, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/497,129

(22) PCT Filed: Mar. 27, 2017

(86) PCT No.: PCT/JP2017/012326
§ 371 (c)(1),
(2) Date: Sep. 24, 2019

(87) PCT Pub. No.: WO2018/179039
PCT Pub. Date: Oct. 4, 2018

(65) Prior Publication Data
US 2020/0380729 A1    Dec. 3, 2020

(51) Int. Cl.
*G06T 3/00* (2006.01)
*G06T 19/00* (2011.01)
*G06T 7/593* (2017.01)
*G06T 7/80* (2017.01)

(52) U.S. Cl.
CPC ............ *G06T 7/85* (2017.01); *G06T 3/00* (2013.01); *G06T 7/593* (2017.01); *G06T 19/006* (2013.01); *G06T 2200/24* (2013.01); *G06T 2207/10012* (2013.01)

(58) Field of Classification Search
CPC .. G06T 7/85; G06T 7/593; G06T 3/00; G06T 19/006; G06T 2200/24; G06T 2207/10012
USPC ........................................................ 345/419
See application file for complete search history.

(56) References Cited

U.S. PATENT DOCUMENTS

| 5,960,108 | A | * | 9/1999 | Xiong | ................... | G06T 3/0062 |
| | | | | | | 382/154 |
| 2005/0259118 | A1 | * | 11/2005 | Mojaver | .............. | H04N 5/2628 |
| | | | | | | 345/647 |
| 2009/0167886 | A1 | * | 7/2009 | Tonomura | ............. | G06T 3/0031 |
| | | | | | | 348/222.1 |

(Continued)

FOREIGN PATENT DOCUMENTS

| JP | 2007-192832 A | 8/2007 |
| JP | 2009-176273 A | 8/2009 |

OTHER PUBLICATIONS

International Search Report for PCT/JP2017/012326 dated May 16, 2017 [PCT/ISA/210].

*Primary Examiner* — Hai Tao Sun
(74) *Attorney, Agent, or Firm* — Sughrue Mion, PLLC

(57) ABSTRACT

A projection image generation unit 91 applies a plurality of projection schemes that use the radius of a visual field region of a fisheye-lens camera to an image that is imaged by the fisheye-lens camera to generate a plurality of projection images. A display unit 92 displays the plurality of projection images. A selection acceptance unit 93 accepts a projection image selected by a user from among the plurality of displayed projection images. A projection scheme determination unit 94 determines a projection scheme on the basis (Continued)

of the selected projection image. An output unit 95 outputs an internal parameter of the fisheye-lens camera that corresponds to the determined projection scheme.

16 Claims, 15 Drawing Sheets

(56) References Cited

U.S. PATENT DOCUMENTS

2012/0051666 A1\* 3/2012 Minakawa ............ G06T 3/0018
382/295

\* cited by examiner

FIG. 4
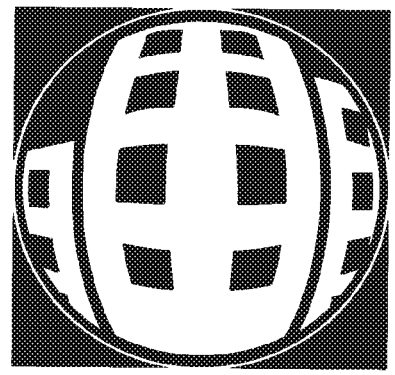
PROJECTION SCHEME 0
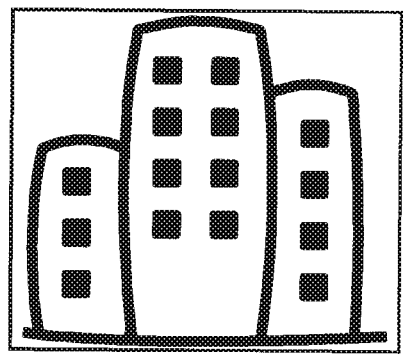
PROJECTION SCHEME 1
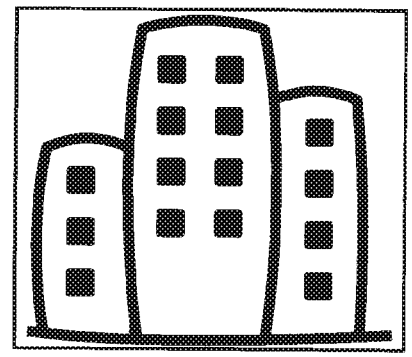
PROJECTION SCHEME 2
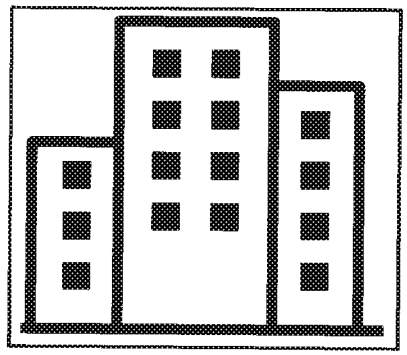
PROJECTION SCHEME 3
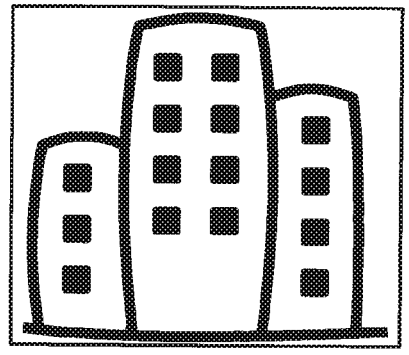
SELECT SCHEME
HAVING HIGHEST LINEARITY FIG. 7
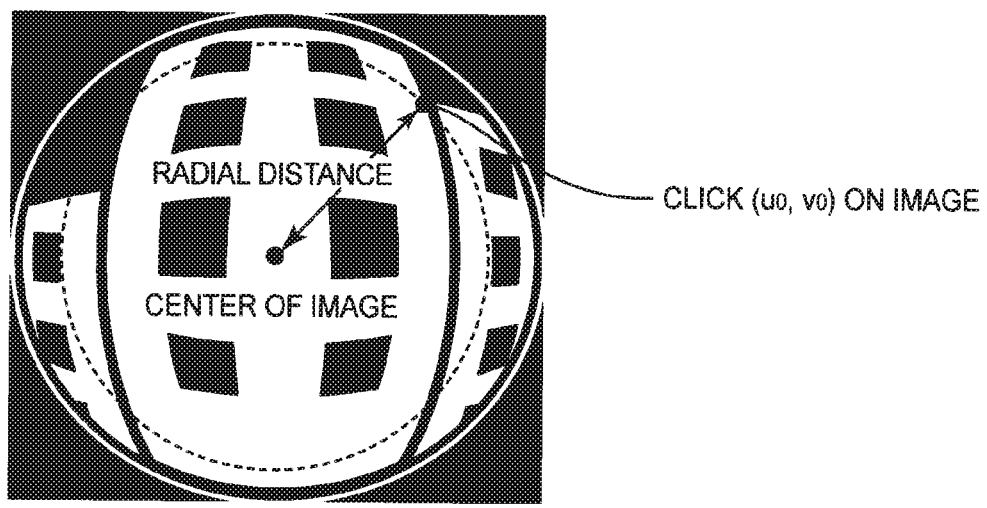
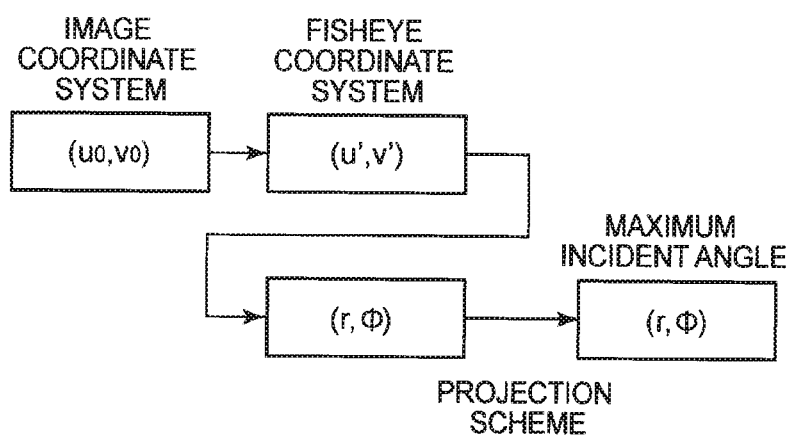

FIG. 8
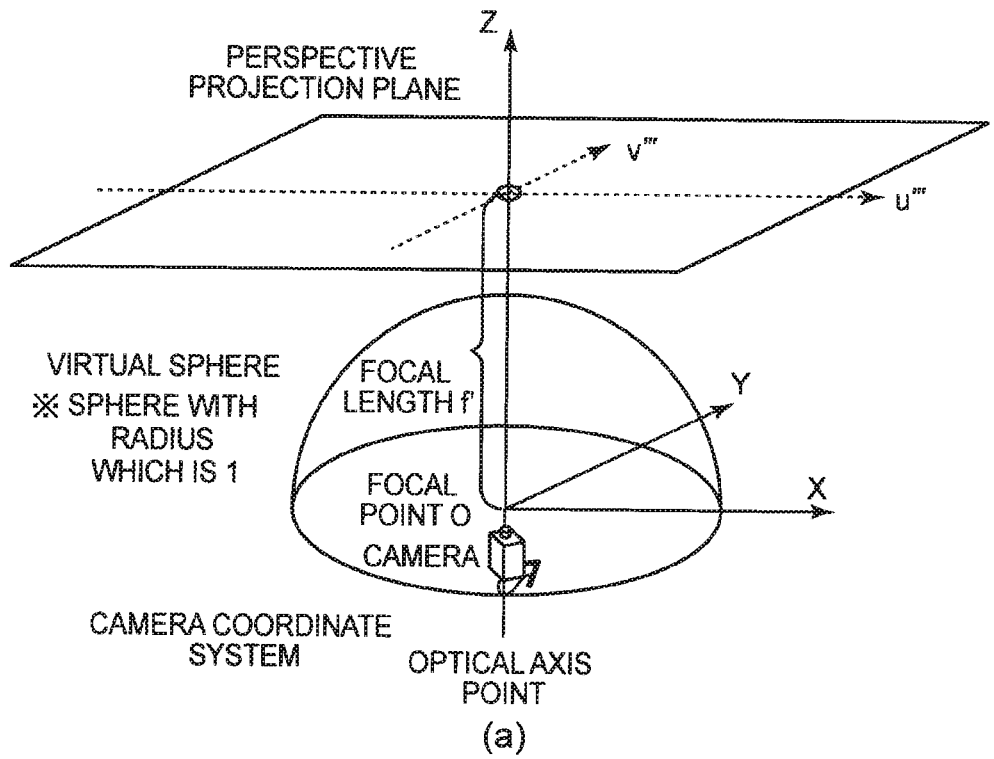
(a)
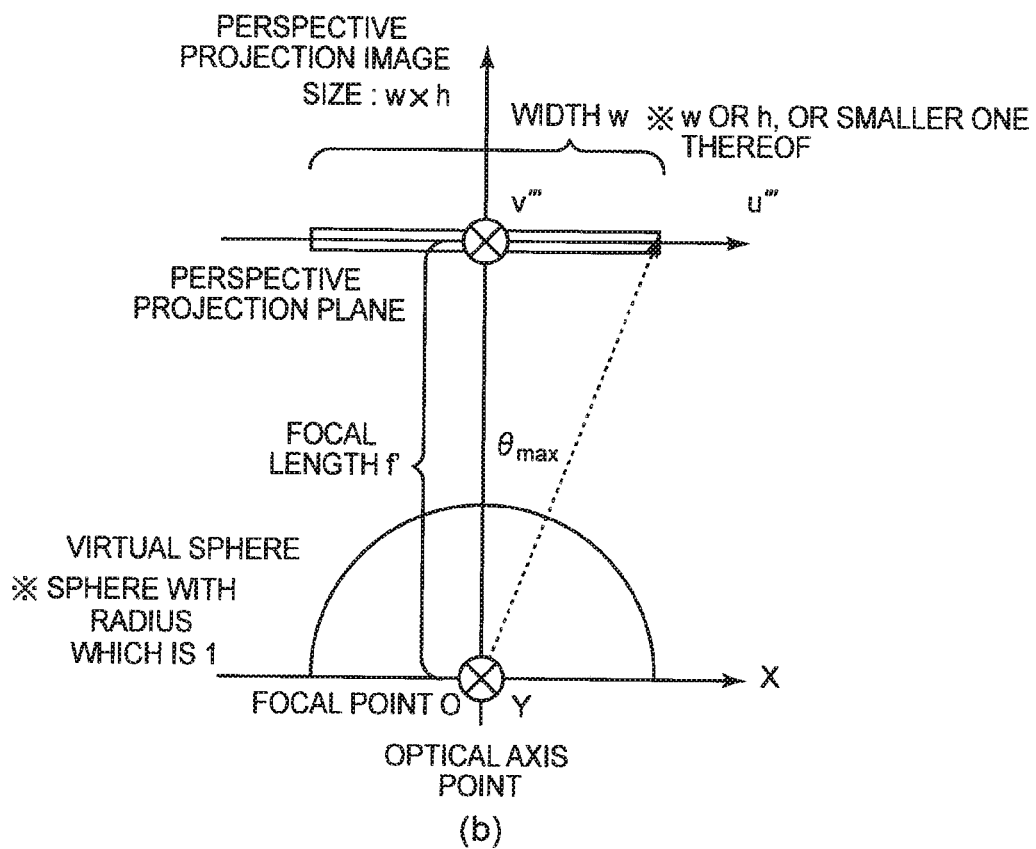
(b)

FIG. 18
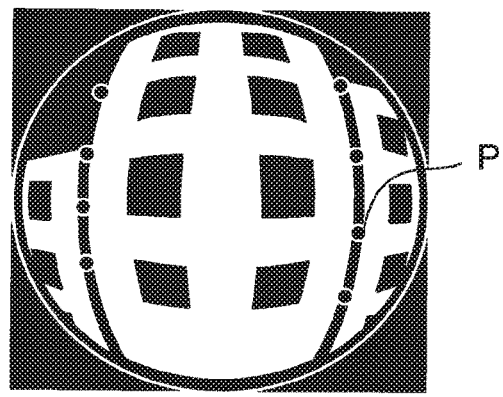
(a)
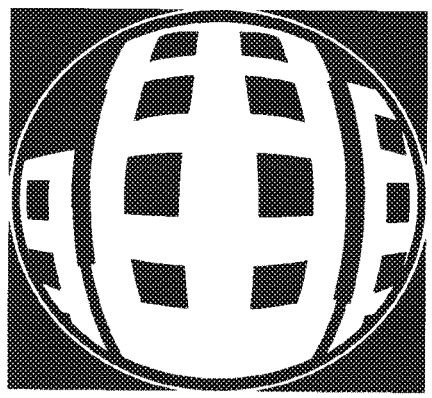
(b)
DIVIDE LINE AT REGULAR INTERVALS
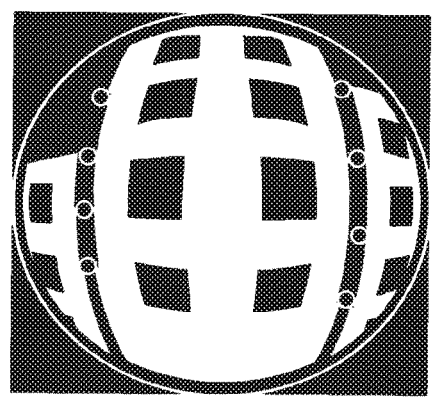
(c)

CAMERA PARAMETER ESTIMATION DEVICE, METHOD AND PROGRAM

CROSS REFERENCE TO RELATED APPLICATIONS

This application is a National Stage of International Application No. PCT/JP2017/012326 filed Mar. 27, 2017.

TECHNICAL FIELD

The present invention relates to a camera parameter estimation device, a camera parameter estimation method, and a camera parameter estimation program and particularly to a camera parameter estimation device that estimates an internal parameter of a fisheye-lens camera, and to a camera parameter estimation method and a camera parameter estimation program therefor.

BACKGROUND ART

The internal parameter of the fisheye-lens camera is a parameter capable of transforming a camera coordinate system representing three-dimensional coordinates based on the optical axis of a camera and an image coordinate system representing two-dimensional coordinates on an image and a parameter indicating the center of the image, a distortion of an image sensor, and a lens distortion (in other words, a projection scheme+a related parameter). If a point on an arbitrary coordinate system is known by using the internal parameter, the point is able to be transformed to a point on each coordinate system.

A method of estimating an internal parameter of a fisheye-lens camera is described in, for example, Patent Literature (PTL) 1. In the method described in PTL 1, first, a special calibration pattern is photographed, where the calibration pattern includes three chess patterns orthogonal to each other. Subsequently, an internal parameter is tentatively estimated from the elliptical fitting of a view boundary and the conditions of prior knowledge of a projection scheme and no tangential distortion, and then points in the real space indicating grid points of the calibration pattern are projected on the image by using an external parameter and an internal parameter. Thereafter, projection errors between the coordinates of the projected grid points and the coordinates of the grid points directly acquired from the image are minimized to estimate the internal parameter.

CITATION LIST

Patent Literature

PTL 1: Japanese Patent Application Laid-Open No. 2007-192832

SUMMARY OF INVENTION

Technical Problem

On the other hand, the estimation method described in PTL 1 has some problems. A first problem is that the internal parameter cannot be estimated without photographing a special calibration pattern, a substance, a space, and the like having known points in three-dimensional positions, which makes the estimation complicated. The reason is that the internal parameter is estimated while estimating the external parameter and the internal parameter simultaneously because of the correspondence between the points in the real space in three-dimensional positions and points on the image.

A second problem is that it is necessary to previously obtain a projection scheme indicating a lens distortion of the internal parameter for a fisheye-lens camera required to be estimated. The reason is that the initial value of the parameter indicating the lens distortion of the internal parameter, in other words, the initial value of the internal parameter is determined on the basis of the projection scheme.

Therefore, an object of the present invention is to provide a camera parameter estimation device, a camera parameter estimation method, and a camera parameter estimation program capable of easily estimating an internal parameter without the need for prerequisite knowledge of a special calibration pattern or a projection scheme.

Solution to Problem

A camera parameter estimation device according to the present invention includes: a projection image generation unit that applies a plurality of projection schemes that use the radius of a visual field region of a fisheye-lens camera to an image that is imaged by the fisheye-lens camera to generate a plurality of projection images; a display unit that displays the plurality of projection images: a selection acceptance unit that accepts a projection image selected by a user from among the plurality of displayed projection images; a projection scheme determination unit that determines a projection scheme on the basis of the selected projection image; and an output unit that outputs an internal parameter of the fisheye-lens camera that corresponds to the determined projection scheme.

A camera parameter estimation method according to the present invention includes: applying a plurality of projection schemes that use the radius of a visual field region of a fisheye-lens camera to an image that is imaged by the fisheye-lens camera to generate a plurality of projection images; displaying the plurality of projection images: accepting a projection image selected by a user from among the plurality of displayed projection images; determining a projection scheme on the basis of the selected projection image; and outputting an internal parameter of the fisheye-lens camera that corresponds to the determined projection scheme.

A camera parameter estimation program according to the present invention causes a computer to perform: a projection image generation process of applying a plurality of projection schemes that use the radius of a visual field region of a fisheye-lens camera to an image that is imaged by the fisheye-lens camera to generate a plurality of projection images; a display process of displaying the plurality of projection images on a display device: a selection acceptance process of accepting a projection image selected by a user from among the plurality of displayed projection images; a projection scheme determination process of determining a projection scheme on the basis of the selected projection image; and an output process of outputting an internal parameter of the fisheye-lens camera that corresponds to the determined projection scheme.

Advantageous Effects of Invention

The present invention enables an internal parameter to be easily estimated without the need for prerequisite knowledge of a special calibration pattern or a projection scheme.

BRIEF DESCRIPTION OF DRAWINGS

FIG. 4 is an explanatory diagram illustrating an example of an image generated in a plurality of projection schemes from an image photographed by a fisheye-lens camera.

FIG. 7 is an explanatory diagram for describing an example of a method of calculating a maximum incident angle.

FIG. 8 is an explanatory diagram for describing an example of a method of calculating a focal length.

FIG. 18 is an explanatory diagram illustrating an example of accepting an indicated portion decided as a straight line.

DESCRIPTION OF EMBODIMENT

Exemplary embodiments of the present invention will be described hereinafter with reference to accompanying drawings.

Exemplary Embodiment 1

Figure 1:
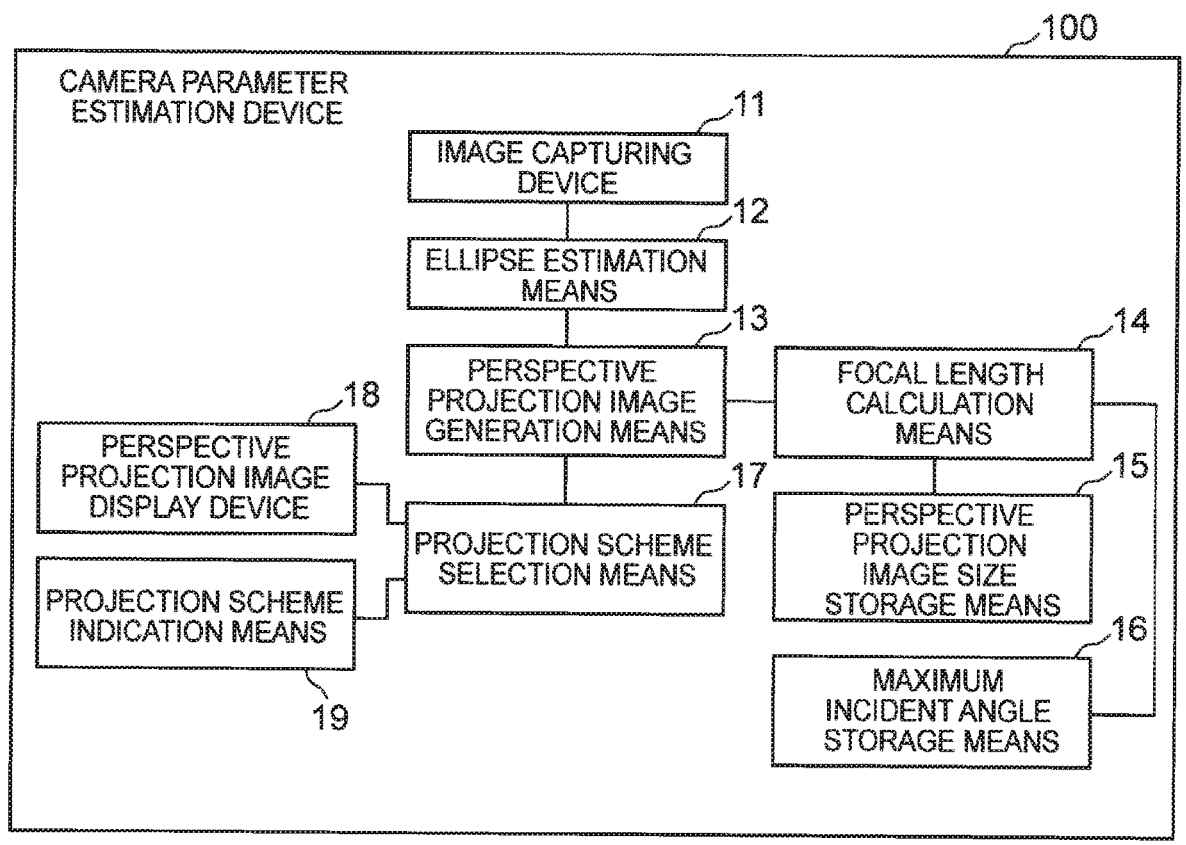
FIG. 1 is a block diagram illustrating a configuration example of a first exemplary embodiment of a camera parameter estimation device according to the present invention.

FIG. 1 is a block diagram illustrating a configuration example of a first exemplary embodiment of a camera parameter estimation device according to the present invention. A camera parameter estimation device 100 of this exemplary embodiment includes an image capturing device 11, an ellipse estimation means 12, a perspective projection image generation means 13, a focal length calculation means 14, a perspective projection image size storage means 15, a maximum incident angle storage means 16, a projection scheme selection means 17, a perspective projection image display device 18, and a projection scheme indication means 19.

The image capturing device 11 captures an image for use in estimation. Specifically, the image capturing device 11 captures a landscape image including a straight line imaged by a fisheye lens. The landscape image including a straight line may be, for example, a landscape image including a building, a telephone pole, a desk, a pillar, a pattern of a floor, and the like.

The captured image, however, is not limited to a landscape image as long as the image includes a straight line. The captured image may be, for example, a special grid pattern as described in PTL 1. Although it is cumbersome to prepare the special grid pattern for each estimation and to image the pattern, the camera parameter estimation device 100 of this exemplary embodiment is able to easily estimate the internal parameter without using any special grid pattern by a process described later.

The image capturing device 11 may capture an image imaged by an imaging means (not illustrated), may read an image from an arbitrary storage unit (not illustrated), or may receive an image via a communication network.

The ellipse estimation means 12 acquires a part of the internal parameter of the fisheye lens that imaged an image therefrom. In this specification, the ellipse estimation means 12 estimates the center of the image ($C_u$, $C_v$), a distortion a of an image sensor, and a radius R of the visual field region of the fisheye lens from the imaged that has been imaged. Theoretically, the visual field region of the fisheye lens has a perfect circle with the radius which is R.

The ellipse estimation means 12 performs, for example, elliptical fitting for the view boundary of the image captured by the fisheye-lens camera to acquire the center of the image ($C_u$, $C_v$) and the distortion a of the image sensor, each of which is a part of the internal parameter. Furthermore, the ellipse estimation means 12 acquires the radius R of a perfect circle of a view boundary as a parameter for a plurality of typical projection schemes, in the case where the view boundary is shaped in the perfect circle. The method of acquiring the radius R, however, is not limited to the elliptical fitting.

Figure 2:
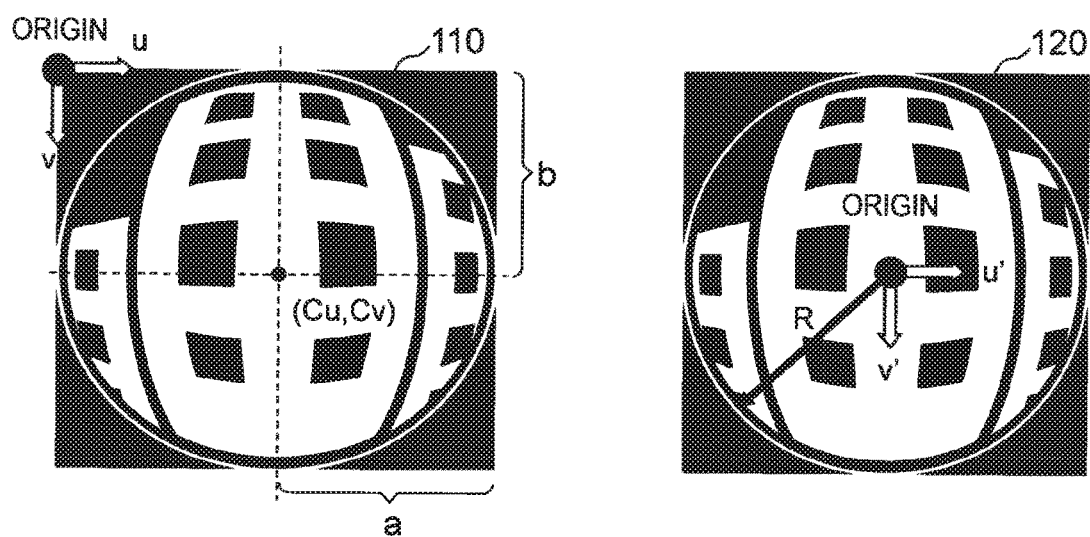
FIG. 2 is an explanatory diagram illustrating an example of a method of acquiring a part of an internal parameter.

FIG. 2 is an explanatory diagram illustrating an example of a method of acquiring a part of the internal parameter. An image 110 that has been imaged is able to be represented in an image coordinate system with the upper left of the image as the origin, u as the horizontal axis direction, and v as the vertical axis direction. Since the image imaged by the fisheye lens has an elliptical shape, the ellipse is expressed by the following formula 1 by using the center of the image ($C_u$, $C_v$) when assuming that 2a and 2b are the length in the major axis and the length in the minor axis, respectively.

[Math. 1]

$$\frac{(u-c_u)^2}{a^2} + \frac{(v-c_v)^2}{b^2} = 1 \qquad \text{(Formula 1)}$$

(Formula 1)

Subsequently, consideration is made on a polar coordinate system with the optical axis of the fisheye-lens camera as the center (hereinafter, referred to as "fisheye coordinate system"). As illustrated in an image 120 of FIG. 2, the ellipse estimation means 12 calculates an internal parameter for use in returning the view boundary so as to have a perfect circle. In this specification, the ellipse estimation means 12 calculates the internal parameter so that a half of the length 2b in the minor axis equals the radius R of the perfect circle. In other words, "R=b" is satisfied. Note that, however, "R=a" may be satisfied.

When assuming that the center of the circle is the origin and u´ and v´ represent Cartesian coordinates in the fisheye coordinate system, respective points in the image coordinate system are able to be transformed to respective points in the fisheye coordinate system by using a formula 2 described below. In the formula 2, α is a distortion of the image sensor and is calculated by α=b/a.

[Math. 2]

$$\begin{pmatrix} u' \\ v' \end{pmatrix} = \begin{pmatrix} \alpha & 0 \\ 0 & 1 \end{pmatrix} \begin{pmatrix} u - c_u \\ v - c_v \end{pmatrix} \qquad \text{(Formula 2)}$$

Moreover, the ellipse estimation means 12 calculates the polar coordinates in the fisheye coordinate system by the following formula 3.

[Math. 3]

$$r = \sqrt{u'^2 + v'^2}$$

$$\varphi = \tan^{-1}(v'/u') \qquad \text{(Formula 3)}$$

The calculation of r and R enables a calculation of an incident angle in a typical projection scheme. In the following description, four types of typical projection schemes (an equidistant projection scheme, an orthographic projection scheme, a stereographic projection scheme, and an equisolid angle projection scheme) will be illustrated. The projection scheme used by the camera parameter estimation device of this exemplary embodiment is not limited to the above four types.

The incident angle θ in the equidistant projection scheme is calculated by a formula 4 described below. The incident angle θ in the orthographic projection scheme is calculated by a formula 5 described below. The incident angle θ in the stereographic projection scheme is calculated by a formula 6 described below. The incident angle θ in the equisolid angle projection scheme is calculated by a formula 7 described below.

[Math. 4]

$$\theta = \frac{\pi r}{2R} \qquad \text{(Formula 4)}$$

$$\theta = \sin^{-1}\left(\frac{r}{R}\right) \qquad \text{(Formula 5)}$$

$$\theta = 2\tan^{-1}\left(\frac{r}{R}\right) \qquad \text{(Formula 6)}$$

$$\theta = 2\sin^{-1}\left(\frac{\sqrt{2}\,r}{2R}\right) \qquad \text{(Formula 7)}$$

The perspective projection image size storage means 15 stores a size s of a generated perspective projection image. Specifically, the perspective projection image size storage means 15 may store the size represented by the width w and the height h of the image. The sized s of the perspective projection image to be generated is previously determined by a user or the like and is stored in the perspective projection image size storage means 15.

The maximum incident angle storage means 16 stores a maximum incident angle used in the perspective projection image to be generated. In this exemplary embodiment, it is assumed that the maximum incident angle $\theta_{max}$ is previously determined and is stored in the maximum incident angle storage means 16.

The perspective projection image size storage means 15 and the maximum incident angle storage means 16 are implemented by a memory, a magnetic disk, and the like.

The focal length calculation means 14 calculates a focal length used in generating the perspective projection image. The focal length f´ is a distance from the focal point of the fisheye-lens camera to a plane (a perspective projection plane) on which the image imaged by the fisheye-lens camera is displayed as a general image (a perspective projection image).

The focal length calculation means 14 acquires the size s of the perspective projection image from the perspective projection image size storage means 15. Specifically, the focal length calculation means 14 acquires the width w or the height h from the perspective projection image size storage means 15, where the acquired value is denoted by "s." Furthermore, the focal length calculation means 14 acquires the maximum incident angle $\theta_{max}$ from the maximum incident angle storage means 16. In this process, the focal length calculation means 14 calculates the focal length f´ by the following formula 8.

$$f' = s/2 \tan \theta_{max} \qquad \text{(Formula 8)}$$

The perspective projection image generation means 13 generates a general image (in other words, a perspective projection image), which is obtained by performing perspective projection on a plane (perspective projection plane) at a focal length f´ from the camera, by using the internal parameter acquired by the ellipse estimation means 12 for each predetermined projection scheme.

Specifically, the perspective projection image generation means 13 generates a plurality of projection images by applying a plurality of projection schemes. In the above projection scheme, a radius of the visual field region of the fisheye-lens camera is used.

Moreover, the radius R of the visual field region of the fisheye-lens camera is estimated from the image imaged by the ellipse estimation means 12. Therefore, the perspective projection image generation means 13 generates a plurality of projection images by applying the plurality of projection schemes that use the radius of a visual field region of the fisheye-lens camera.

Figure 3:
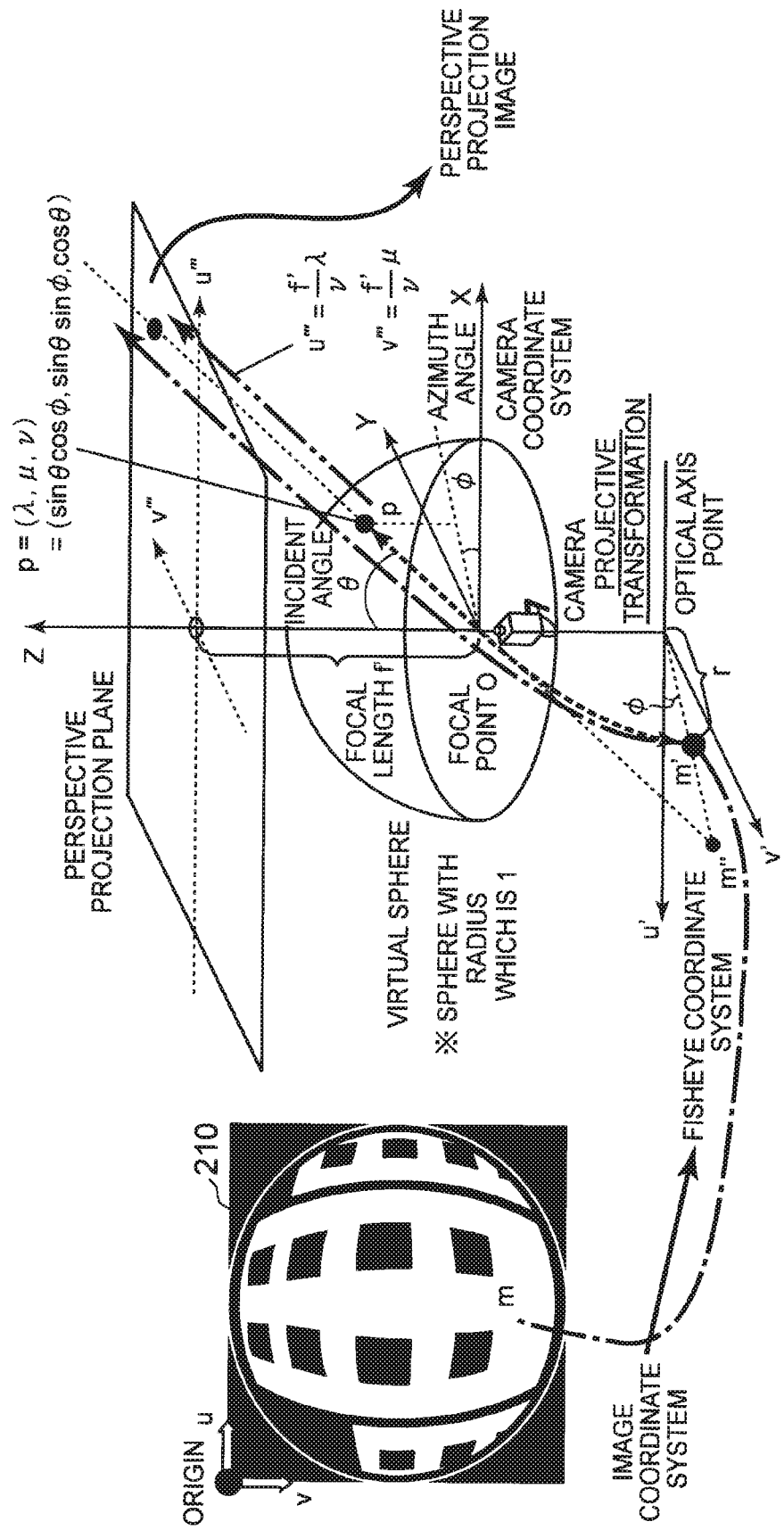
FIG. 3 is an explanatory diagram illustrating a relationship between respective coordinate systems.

FIG. 3 is an explanatory diagram illustrating a relationship between respective coordinate systems. An arbitrary point m in an image 210 illustrated in FIG. 3 represented in the image coordinate system is able to be transformed to a point m′ in the fisheye coordinate system, which is represented by r and φ, by the above formulae 2 and 3. Furthermore, the point m′ in the fisheye coordinate system is able to be transformed to a point p on a virtual sphere in the camera coordinate system by acquiring the incident angle θ on the basis of the specified projection scheme and performing projective transformation.

Assuming that the virtual sphere is a sphere with radius which is 1, θ indicates an incident angle, and φ indicates an azimuth angle, the point p on the virtual sphere is able to be calculated by the following formula 9.

$$p=(\lambda,\mu,\nu)=(\sin\theta\cos\varphi,\sin\theta\sin\varphi,\cos\theta) \qquad \text{(Formula 9)}$$

In addition, the point p in the camera coordinate system is able to be transformed to a point (u‴, v‴) in the perspective projection plane by using a formula 10 described below. Character f′ in the formula 10 is a focal length f′ calculated by the focal length calculation means 14.

[Math. 5]

$$u''' = \frac{f'}{\nu}\lambda \qquad \text{(Formula 10)}$$
$$v''' = \frac{f'}{\nu}\mu$$

In this exemplary embodiment, the perspective projection image generation means 13 applies a plurality of projection schemes to the image captured by the image capturing device 11 (in other words, an image imaged by the fisheye-lens camera) to generate a plurality of projection images.

The projection scheme selection means 17 displays the generated projection image on the perspective projection image display device 18. The perspective projection image display device 18 is implemented by, for example, a touch panel or a display device.

FIG. 4 is an explanatory diagram illustrating an example of the image generated in the plurality of projection schemes from the image photographed by the fisheye-lens camera. The example in FIG. 4 illustrates differences in degree of distortion that are present between the images generated in different projection schemes.

The projection scheme selection means 17 determines a projection scheme on the basis of the selected perspective projection image. The selection of the perspective projection image is indicated by a projection scheme indication means 19 described later.

The projection scheme selection means 17 then outputs an internal parameter of the fisheye-lens camera that corresponds to the determined projection scheme. Specifically, the projection scheme selection means 17 determines and outputs a projection scheme, a parameter (radius R) that corresponds to the projection scheme, and an internal parameter representing the center of the image and the distortion of the imaging element.

The projection scheme indication means 19 accepts a projection image selected by a user from among the plurality of displayed projection images. Specifically, if the user references a plurality of projection images and decides a projection image including a straight line having the highest linearity, the projection scheme indication means 19 accepts the projection image selected by the user decision.

The high linearity means a small shift from a straight line. In other words, it can be said that a smaller shift from a straight line indicates higher linearity. Since an image transformed on the basis of an appropriate projection scheme is more similar to the original projection image, a part representing a straight line in the original image is transformed so as to be more similar to the straight line. On the other hand, an image transformed on the basis of a different projection scheme cannot be appropriately transformed, thereby causing a distortion also in a part representing a straight line in the original image.

In this manner, the perspective projection image generation means 13 generates a plurality of projection images by applying a plurality of projection schemes, thereby enabling a user to select an appropriate image, and thus an appropriate projection scheme is able to be determined.

The projection scheme indication means 19 may notify the projection scheme selection means 17 of a projection image present in a specified position among a plurality of projection images displayed on a touch panel. Moreover, the projection scheme indication means 19 may notify the projection scheme selection means 17 of a projection image present in a position specified by a pointing device.

The ellipse estimation means 12, the perspective projection image generation means 13, the focal length calculation means 14, the projection scheme selection means 17, and the projection scheme indication means 19 are implemented by the CPU of a computer operating according to a program (a camera parameter estimation program).

For example, the program is stored in a storage unit (not illustrated) included in the camera parameter estimation device 100 and the CPU may read the program to operate as the ellipse estimation means 12, the perspective projection image generation means 13, the focal length calculation means 14, the projection scheme selection means 17, and the projection scheme indication means 19 according to the program.

Furthermore, the ellipse estimation means 12, the perspective projection image generation means 13, the focal length calculation means 14, the projection scheme selection means 17, and the projection scheme indication means 19 may be implemented by dedicated hardware devices, respectively. Moreover, the fisheye camera itself for photographing an image may function as a so-called intelligent camera and may have these respective means. For example, the fisheye camera may include the image capturing device 11, the ellipse estimation device 12, and the perspective projection image generation means 13 (additionally, the focal length calculation means 14, the perspective projection image size storage means 15, and the maximum incident angle storage means 16, if necessary). Furthermore, the fisheye camera may transmit a generated perspective projection image to the projection scheme selection means 17 to accept a projection image selected by a user.

Figure 5:
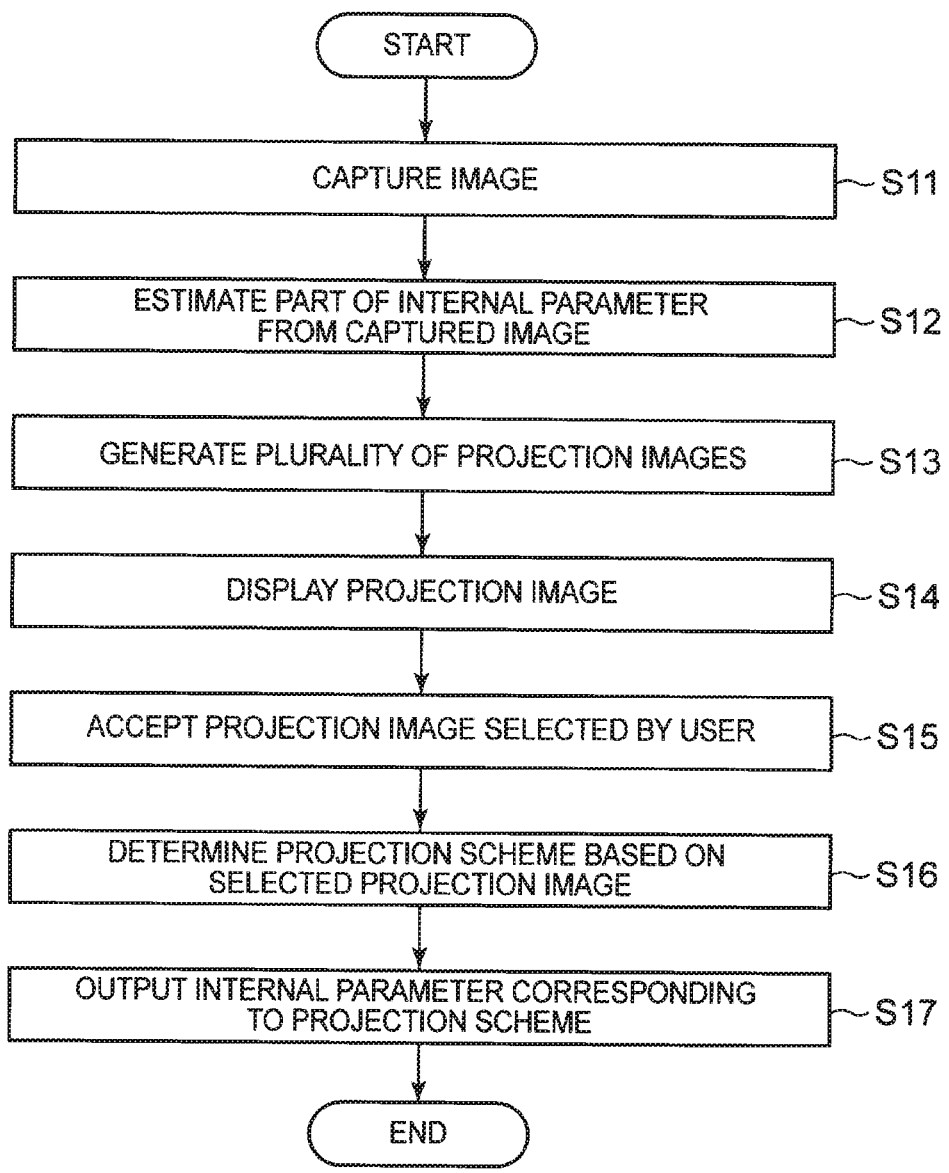
FIG. 5 is a flowchart illustrating an operation example of a camera parameter estimation device 100 according to a first exemplary embodiment.

The following describes an operation example of the camera parameter estimation device 100 of this exemplary embodiment. FIG. 5 is a flowchart illustrating the operation example of the camera parameter estimation device 100 according to the first exemplary embodiment.

The image capturing device 11 captures an image imaged by the fisheye-lens camera (step S11). The ellipse estimation means 12 estimates a part of the internal parameter from the captured image (step S12). Specifically, the ellipse estimation means 12 estimates the center of the image, a distortion of an image sensor, and the radius of a visual field region of the fisheye-lens camera as an internal parameter.

The perspective projection image generation means 13 applies a plurality of projection schemes to the captured image to generate a plurality of projection images (step S13). The projection scheme selection means 17 displays the generated projection image on the perspective projection image display device 18 (step S14). The projection scheme indication means 19 accepts a projection image selected by a user from among the plurality of projection images displayed on the perspective projection image display device 18 (step S15). The projection scheme selection means 17 determines a projection scheme on the basis of the selected projection image (step S16). The projection scheme selection means 17 then outputs an internal parameter of the fisheye-lens camera that corresponds to the determined projection scheme (step S17).

As described above, in this exemplary embodiment, the perspective projection image generation means 13 applies a plurality of projection schemes that use the radius of a visual field region of a fisheye-lens camera to an image imaged by the fisheye-lens camera to generate a plurality of projection images. The perspective projection image display device 18 displays a plurality of projection images and the projection scheme indication means 19 accepts a projection image selected by a user from among the plurality of displayed projection images. The projection scheme selection means 17 then determines a projection scheme on the basis of the selected projection image and outputs an internal parameter of the fisheye-lens camera that corresponds to the determined projection scheme. Therefore, the internal parameter is able to be easily estimated without the need for a special calibration pattern or prerequisite knowledge of a projection scheme.

Exemplary Embodiment 2

The following describes a second exemplary embodiment of a camera parameter estimation device according to the present invention. In the first exemplary embodiment, the projection scheme indication means 19 accepts a projection image selected by a user from among the plurality of projection images displayed on the perspective projection image display device 18. In this process, the user references a plurality of projection images to decide a projection image including a straight line having the highest linearity.

In order to make the user decide a projection image having high linearity, preferably a straight line focused on by the user is able to be displayed appropriately. Therefore, in this exemplary embodiment, description will be made on a configuration enabling the range of the perspective projection image to be adjusted.

Figure 6:
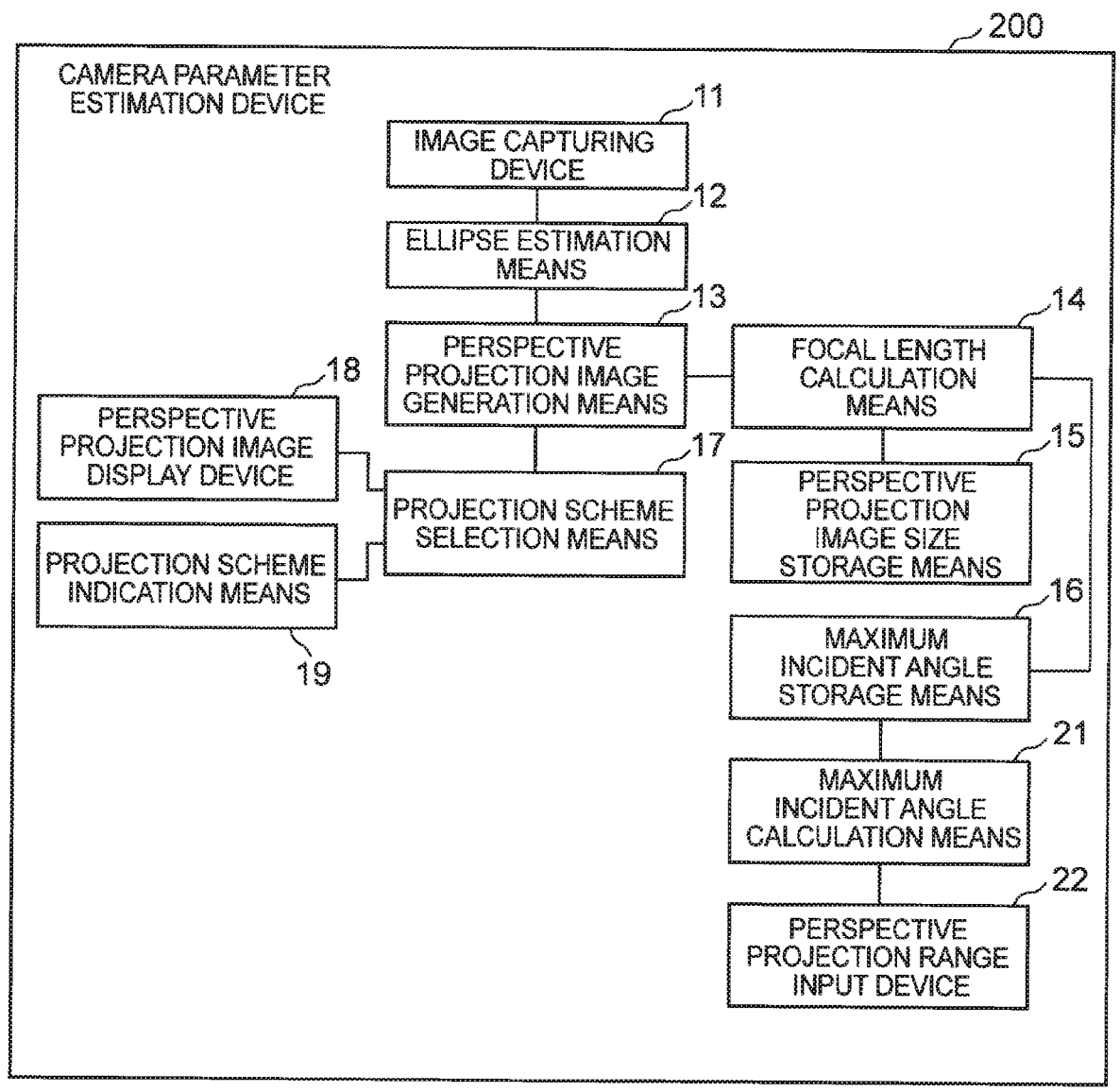
FIG. 6 is a block diagram illustrating a configuration example of a second exemplary embodiment of a camera parameter estimation device according to the present invention.

FIG. 6 is a block diagram illustrating a configuration example of the second exemplary embodiment of a camera parameter estimation device according to the present invention. A camera parameter estimation device 200 according to this exemplary embodiment includes an image capturing device 11, an ellipse estimation means 12, a perspective projection image generation means 13, a focal length calculation means 14, a perspective projection image size storage means 15, a maximum incident angle storage means 16, a projection scheme selection means 17, a perspective projection image display device 18, a projection scheme indication means 19, a maximum incident angle calculation means 21, and a perspective projection range input device 22.

Specifically, the camera parameter estimation device of this exemplary embodiment further includes the maximum incident angle calculation means 21 and the perspective projection range input device 22 in comparison with the camera parameter estimation device of the first exemplary embodiment.

The perspective projection range input device 22 inputs a range of generating a projection image in the captured image (in other words, the image imaged by a fisheye-lens camera). Specifically, the perspective projection range input device 22 accepts the range to generate the projection image as an input from the user.

As illustrated in the above FIG. 3, the perspective projection image is made by enlarging the range from the radial distance, which is determined by the maximum incident angle $\theta_{max}$, to the center of the image with respect to the captured image. In order to make the user confirm the linearity of the straight line in the perspective projection image, it is necessary to take a close-up shot of the straight line. Therefore, to reduce the distance from the center of the captured image (radial distance) to enlarge the image to be displayed, the perspective projection range input device 22 inputs the radial distance from the center of the image.

The method of specifying the range is arbitrary. The maximum incident angle calculation means 21 may display, for example, an image imaged by the fisheye-lens camera, acquire a point $(u_0, v_0)$ in the image clicked on the displayed screen, and then input the radius from the center of the image. Moreover, in the case where a plurality of points are clicked on the screen, the maximum incident angle calculation means 21 may acquire a point having the shortest radial distance among the points and input the radial distance.

The maximum incident angle calculation means 21 calculates the maximum incident angle for each projection scheme on the basis of the input range. FIG. 7 is an explanatory diagram for describing an example of a method of calculating the maximum incident angle. When the point $(u_0, v_0)$ on the image imaged by the fisheye-lens camera is specified, the maximum incident angle calculation means 21 transforms the point to a point $(u', v')$ in the fisheye coordinate system, for example, on the basis of a part of the internal parameter obtained by the ellipse estimation means 12 and the above formula 2. Furthermore, the maximum incident angle calculation means 21 calculates r and φ from the transformed point $(u', v')$ in the fisheye coordinate system on the basis of the above formula 3.

The maximum incident angle calculation means 21 uses r, which is calculated by the above process, and R, which is a part of the internal parameter obtained by the ellipse estimation means 12, to calculate the incident angle according to the projection scheme, for example, on the basis of the formula illustrated in one of the above formulae 4 to 7. The incident angle calculated here is treated as the maximum incident angle.

The focal length calculation means 14 calculates a focal length by using the maximum incident angle determined by the maximum incident angle calculation means 21. FIG. 8 is an explanatory diagram for describing an example of a method of calculating the focal length. FIG. 8(a) illustrates a relationship between the camera coordinate system and the perspective projection plane by using a perspective view, and FIG. 8(b) illustrates the relationship between the camera coordinate system and the perspective projection plane viewed from the Y-axis direction ($v'''$-axis direction). In FIG. 8, the $u'''$-axis direction on the perspective projection plane corresponds to the width w of the perspective projection image and the v‴-axis direction on the perspective projection plane corresponds to the height h of the perspective projection image.

As illustrated in FIG. 8(b), the focal length calculation means 14 calculates the focal length f′ with a formula 11 described below by using a value s, which is a smaller value of w and h in the calculated maximum incident angle $\theta_{max}$ and the perspective projection image size (w×h). FIG. 8(b) illustrates an example of calculating the focal length f′ with reference to the width w.

[Math. 6]

$$f' = \frac{s}{2\tan\theta_{max}}$$ (Formula 11)

The perspective projection image generation means 13 generates a projection image of the range determined according to the maximum incident angle. Specifically, the perspective projection image generation means 13 generates an image projected on the plane of the focal length f′ (perspective projection image), which is determined by the maximum incident angle $\theta_{max}$ calculated by the maximum incident angle calculation means 21.

The ellipse estimation means 12, the perspective projection image generation means 13, the focal length calculation means 14, the projection scheme selection means 17, the projection scheme indication means 19, and the maximum incident angle calculation means 21 are implemented by the CPU of a computer that operates according to a program (camera parameter estimation program).

Furthermore, the perspective projection range input device 22 is implemented by an input-output device such as, for example, a touch panel or the like. Moreover, the perspective projection range input device 22 may be implemented by an output device such as a display device and a pointing device that selects the content output to the output device. In addition, similarly to the first exemplary embodiment, the fisheye camera itself may function as a so-called intelligent camera and may include respective means included in the camera parameter estimation device 200.

Figure 9:
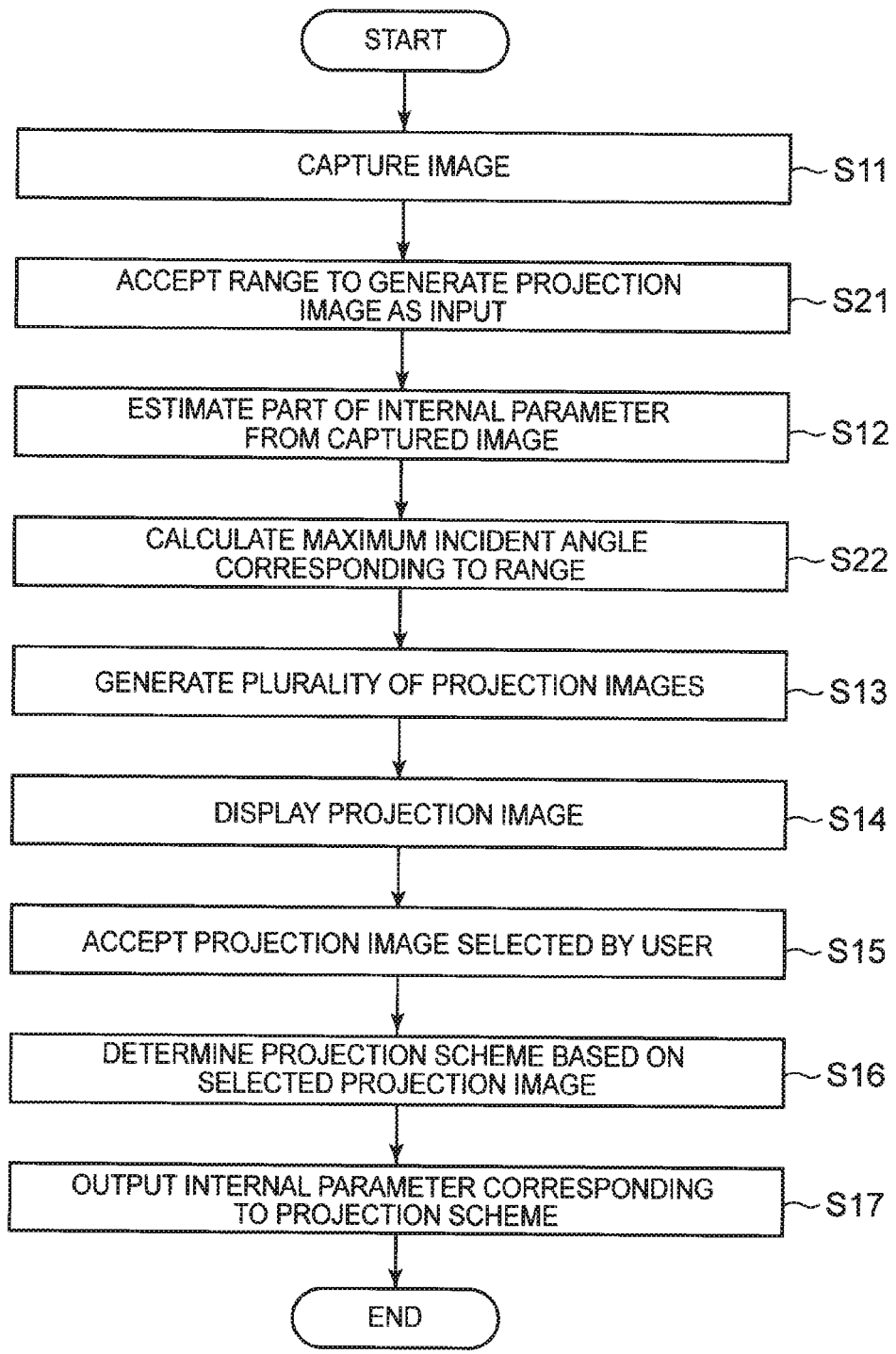
FIG. 9 is a flowchart illustrating an operation example of a camera parameter estimation device 200 according to a second exemplary embodiment.

Subsequently, an operation example of the camera parameter estimation device 200 of this exemplary embodiment will be described. FIG. 9 is a flowchart illustrating an operation example of the camera parameter estimation device 200 according to the second exemplary embodiment. The image capturing device 11 captures an image imaged by the fisheye-lens camera (step S11). The perspective projection range input device 22 accepts the range to generate the projection image as an input from the user (step S21). The ellipse estimation means 12 estimates a part of the internal parameter from the captured image (step S12). The maximum incident angle calculation means 21 calculates the maximum incident angle corresponding to the accepted range for each projection scheme (step S22). The perspective projection image generation means 13 generates a plurality of projection images by applying a plurality of projection schemes to the captured image (step S13).

Hereinafter, the processes of steps 14 to 17 are performed by displaying the generated projection image, accepting a user's selection, determining a projection scheme, and calculating the internal parameter.

As described above, in this exemplary embodiment, the perspective projection range input device 22 accepts the range to generate the projection image as an input and the maximum incident angle calculation means 21 calculates the maximum incident angle corresponding to the range for each projection scheme. The perspective projection image generation means 13 then generates a projection image in the range, which is determined according to the maximum incident angle, for each projection scheme.

Therefore, in addition to the advantageous effects of the first exemplary embodiment, the generated projection image is easily viewable, thereby enabling a user to easily select the projection image generated in an appropriate projection scheme.

Exemplary Embodiment 3

The following describes a third exemplary embodiment of a camera parameter estimation device according to the present invention. As described in the first and second exemplary embodiments, preferably the image that has not been transformed yet to a projection image includes a straight line appropriate for decision in order to let the user to decide a projection image including a straight line having high linearity.

Therefore, in this exemplary embodiment, the description will be made on a method of facilitating the decision of whether or not the image not having been transformed yet to a projection image (in other words, an image photographed by a fisheye-lens camera) is appropriate.

Figure 10:
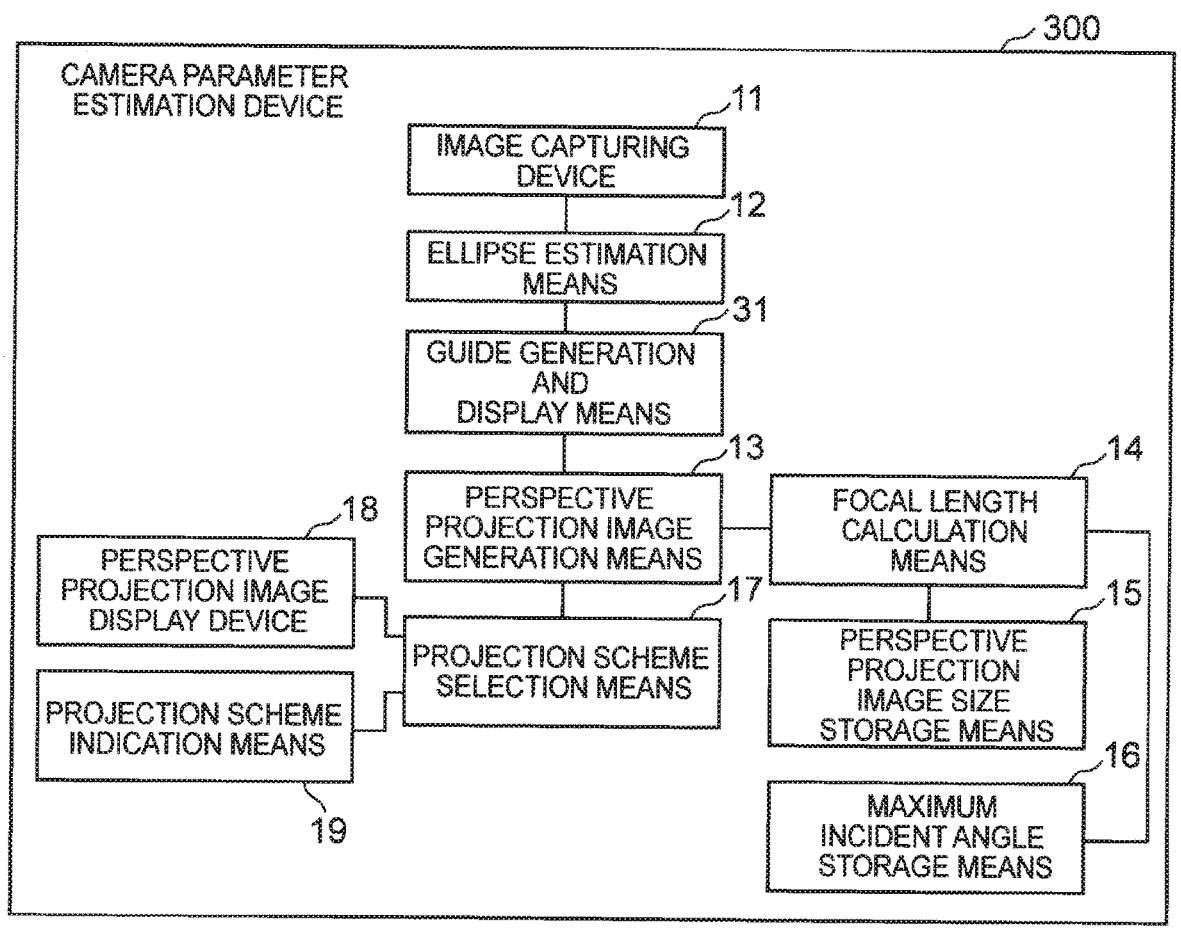
FIG. 10 is a block diagram illustrating a configuration example of a third exemplary embodiment of a camera parameter estimation device according to the present invention.

FIG. 10 is a block diagram illustrating a configuration example of the third exemplary embodiment of the camera parameter estimation device according to the present invention. A camera parameter estimation device 300 of this exemplary embodiment includes an image capturing device 11, an ellipse estimation means 12, a guide generation and display means 31, a perspective projection image generation means 13, a focal length calculation means 14, a perspective projection image size storage means 15, a maximum incident angle storage means 16, a projection scheme selection means 17, a perspective projection image display device 18, and a projection scheme indication means 19.

Specifically, the camera parameter estimation device of this exemplary embodiment further includes the guide generation and display means 31, in comparison with the camera parameter estimation device of the first exemplary embodiment. Incidentally, the camera parameter estimation device 300 may include the maximum incident angle calculation means 21 and the perspective projection range input device 22 described in the second exemplary embodiment.

For the image imaged by the fisheye-lens camera, the guide generation and display means 31 generates a guide for guiding a straight line to a position for assisting in estimating the internal parameter for an image imaged by a fisheye-lens camera and then displays the guide so as to be superimposed on the image. Specifically, the guide generation and display means 31 generates and displays the guide for guiding the straight line to the position of the straight line on the image imaged by the fisheye camera so that the distortion of the straight line looks large in a state where the projection image is transformed to a projection image.

With respect to the position for assisting in estimating the internal parameter, an image closer to the central part has a smaller distortion and an image more parallel to the direction extending radially from the center has a smaller distortion, in the image imaged by the fisheye-lens camera. Therefore, the guide generation and display means 31 displays a guide representing a circle at a predetermined distance from the center of the image or a guide radial from the center of the image so that the guide is superimposed on the captured image. The center of the circle may be in the center position estimated by the ellipse estimation means 12.

Furthermore, to decide the distortion, preferably the straight line has a certain or more length. Therefore, the guide generation and display means 31 may display a guide having a predetermined length so as to be superimposed on the captured image. The length of the guide may be determined in consideration of the length that the user is able to easily decide after the transformation to a projection image. The radius R of the visual field region of the fisheye lens has been successfully calculated by the ellipse estimation means 12, and therefore the length of the guide is also able to be calculated with reference to the radius R.

Figure 11:
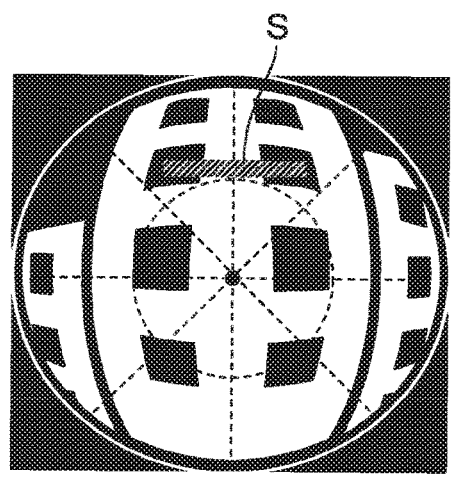
FIG. 11 is an explanatory diagram illustrating an example that a guide is superimposed on an image imaged by a fisheye-lens camera.

FIG. 11 is an explanatory diagram illustrating an example that the guide is superimposed on the image imaged by the fisheye-lens camera. In the example illustrated in FIG. 11, a circular guide is displayed at a distance of a predetermined radius from the center, so that the straight line is displayed outside the displayed circle in guidance. Furthermore, in the example illustrated in FIG. 11, the eight guides are displayed radially from the center, so that a straight line of the image does not follow any of the guides in guidance. Furthermore, in the example illustrated in FIG. 11, a sample S of the length of the straight line is displayed as a guide, so that the straight line has a predetermined or more length in guidance.

Alternatively, the guide generation and display means 31 may display not only one circle, but also multiple circles. A combination of straight lines obtained from the image so as to be tangent to the multiple circles provides the same advantageous effect as the case of displaying radial straight lines.

The guide generation and display means 31 may accept a decision of whether or not the image is to be used from the user. Unless the image is decided to be used, the image capturing device 11 captures another image and the ellipse estimation means 12 estimates an internal parameter, and then the guide generation and display means 31 performs the same process. Until an appropriate image is decided, these processes are repeated.

The guide generation and display means 31 is implemented by the CPU of a computer operating according to a program (camera parameter estimation program) or a graphics device (for example, a display device or the like) that displays a result of generation. Similarly to the first exemplary embodiment, the fisheye camera itself may function as a so-called intelligent camera and may include respective means included in the camera parameter estimation device 300.

Figure 12:
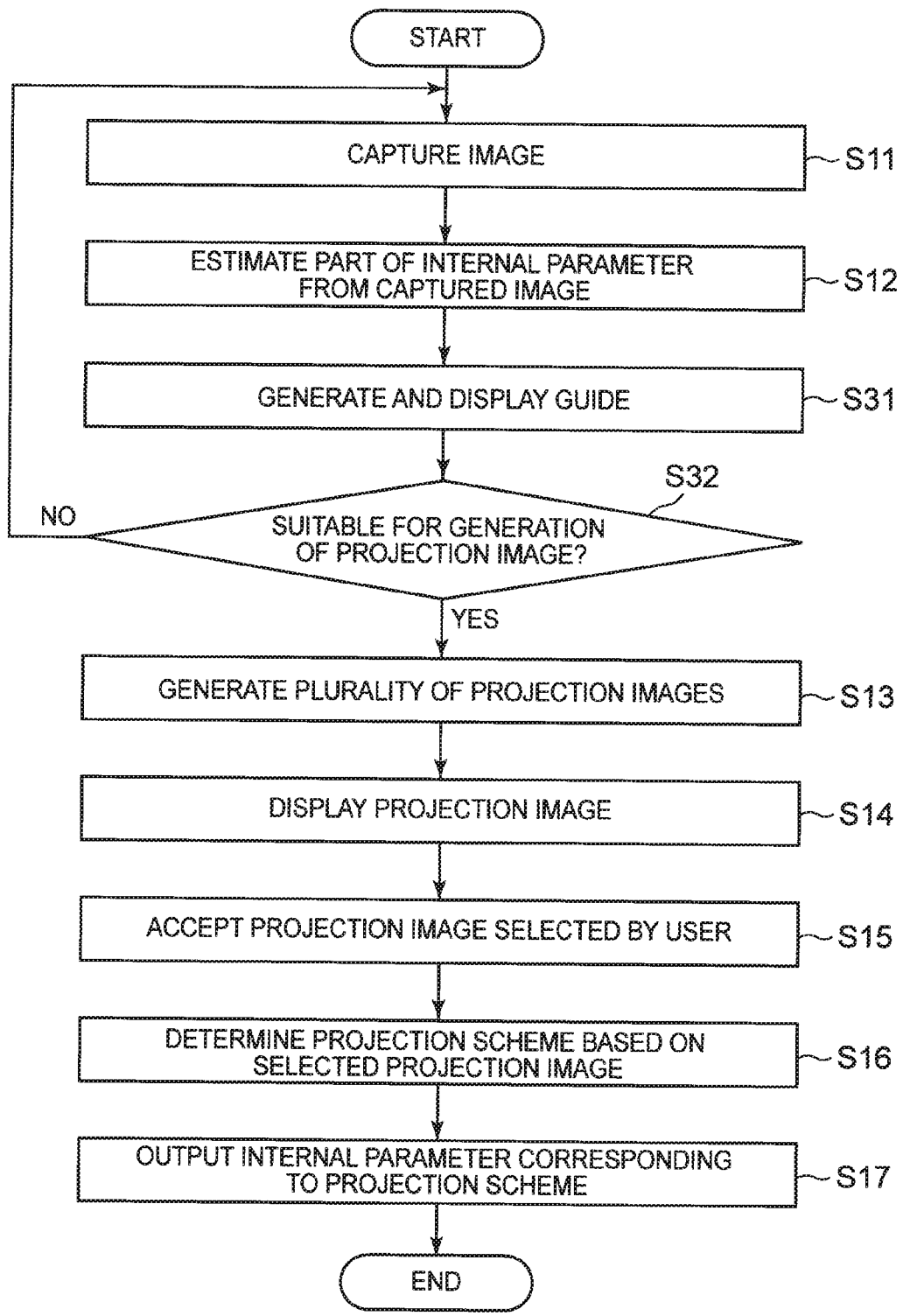
FIG. 12 is a flowchart illustrating an operation example of a camera parameter estimation device 300 of a third exemplary embodiment.

Subsequently, an operation example of the camera parameter estimation device 300 of this exemplary embodiment will be described. FIG. 12 is a flowchart illustrating the operation example of the camera parameter estimation device 300 of the third exemplary embodiment.

The image capturing device 11 captures an image imaged by the fisheye-lens camera (step S11). The ellipse estimation means 12 estimates a part of the internal parameter from the captured image (step S12). The guide generation and display means 31 generates and displays a guide for guiding a straight line to a position for assisting in estimating the internal parameter for an image imaged by the fisheye-lens camera (step S31).

If a user decides that the image is unsuitable for generation of a projection image as a result of displaying the guide (No in step S32), the processes of step S11 for capturing an image and subsequent steps are repeated. On the other hand, if the user decides that the image is suitable for generation of the projection image (Yes in step S32), the processes of step S13 for generating a plurality of projection images and subsequent steps are performed. The subsequent processes are performed similarly to the processes of step S13 and subsequent steps illustrated in FIG. 5. Additionally, any change is not made on a part of the internal parameter in the loop of steps S11, S12, S31, and S32, and therefore step S12 may be omitted in the second and subsequent rounds.

As described above, in this exemplary embodiment, the guide generation and display means 31 generates a guide for guiding a straight line to a position for assisting in estimating an internal parameter for an image imaged by a fisheye-lens camera and displays the guide so as to be superimposed on the image. Therefore, in addition to the advantageous effects of the first exemplary embodiment, a straight line as a target of a decision can be appropriately included in the transformed projection image.

Exemplary Embodiment 4

The following describes a fourth exemplary embodiment of the camera parameter estimation device according to the present invention. In the first to third exemplary embodiments, a user is made to select a perspective projection image to determine a projection scheme. In this exemplary embodiment, description will be made on a method of determining a projection scheme without a user's explicit specification and thereafter outputting an internal parameter.

Figure 13:
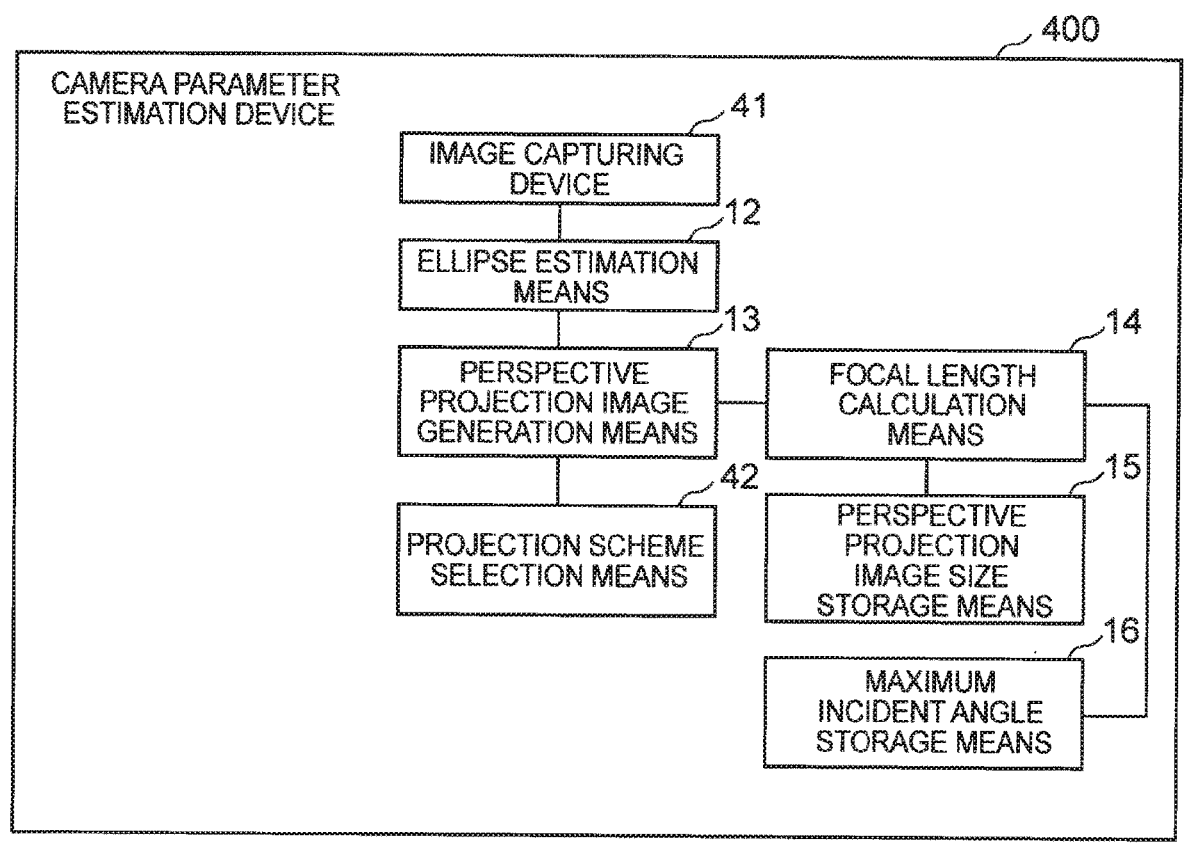
FIG. 13 is a block diagram illustrating a configuration example of a fourth exemplary embodiment of a camera parameter estimation device according to the present invention.

FIG. 13 is a block diagram illustrating a configuration example of the fourth exemplary embodiment of the camera parameter estimation device according to the present invention. A camera parameter estimation device 400 of this exemplary embodiment includes an image capturing device 41, an ellipse estimation means 12, a perspective projection image generation means 13, a focal length calculation means 14, a perspective projection image size storage means 15, a maximum incident angle storage means 16, and a projection scheme selection means 42.

Specifically, the camera parameter estimation device of this exemplary embodiment differs from the camera parameter estimation device of the first exemplary embodiment in not including the perspective projection image display device 18 and the projection scheme indication means 19, in comparison with the camera parameter estimation device of the first exemplary embodiment. The contents of the ellipse estimation means 12, the perspective projection image generation means 13, the focal length calculation means 14, the perspective projection image size storage means 15, and the maximum incident angle storage means 16 are the same as those of the first exemplary embodiment.

The image capturing device 41 of this exemplary embodiment captures an image in which a target including a straight line is imaged by a fisheye-lens camera. Specifically, the image capturing device 41 captures an image in which a target having a line in the image recognizable as a straight line is imaged. For example, the image capturing device 41 captures an image of a target in which the feature points or grid points characterizing the structure of the straight line can be automatically acquired from the image. In this exemplary embodiment, the image capturing device 41 captures an image of a planar chess pattern as a target including a straight line. The planar chess pattern means a black and white checkered pattern.

The image captured by the image capturing device 41, however, is not limited to the image of the planar chess pattern. As long as the image is of a target from which the line in the image can be considered to be a straight line (more specifically, a target in which the features characterizing the structure of a straight line can be automatically acquired from the image), the content of the image is arbitrary. The perspective projection image generation means 13 then applies a plurality of projection schemes to generate a plurality of projection images, similarly to the first exemplary embodiment.

The projection scheme selection means 42 selects one of the plurality of projection images on the basis of the linearity of each of the straight lines included in the generated projection images. The projection scheme selection means 42 then identifies a projection scheme in which the selected projection image has been generated. The projection scheme selection means 42 decides the linearity by calculating the degree of distortion of the line from the features characterizing the structure of the straight line in the image imaged in this exemplary embodiment.

Figure 14:
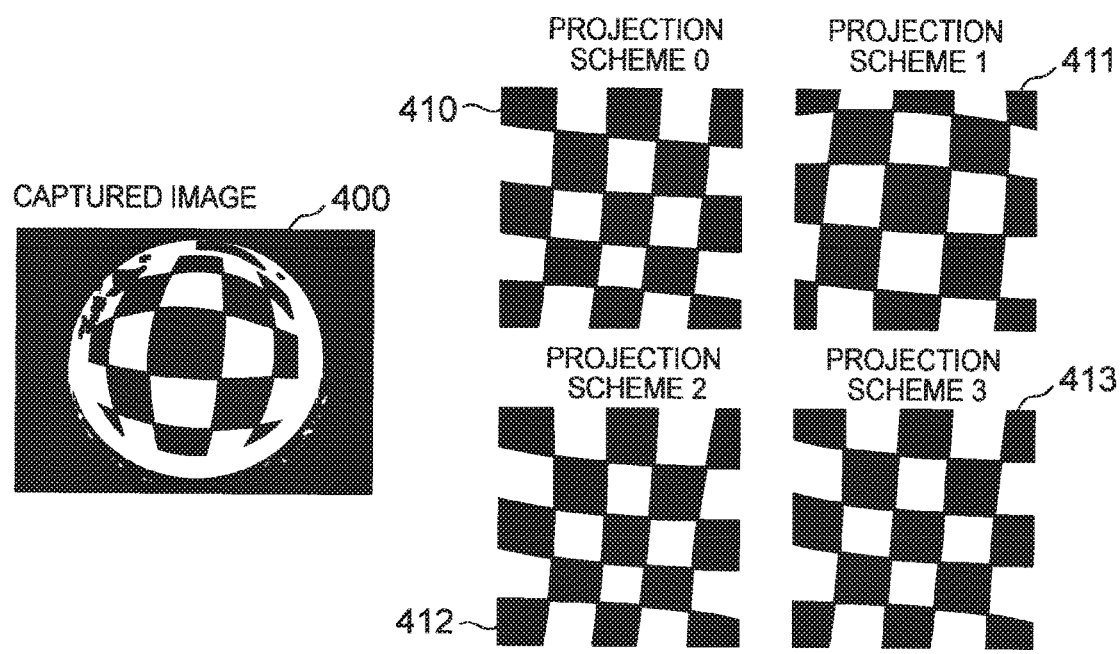
FIG. 14 is an explanatory diagram illustrating an example that a planar chess pattern is returned to a perspective projection image.

FIG. 14 is an explanatory diagram illustrating an example that the planar chess pattern is returned to a perspective projection image. As illustrated in FIG. 14, the image 400 imaged by the fisheye-lens camera is transformed to projection images illustrated by images 410 to 413 according to a plurality of projection schemes. All of the lines constituting the planar chess pattern are straight lines and the projection scheme selection means 42 automatically acquires chess grid points from the image and decides the linearity with reference to the chess grid points.

Figure 15:
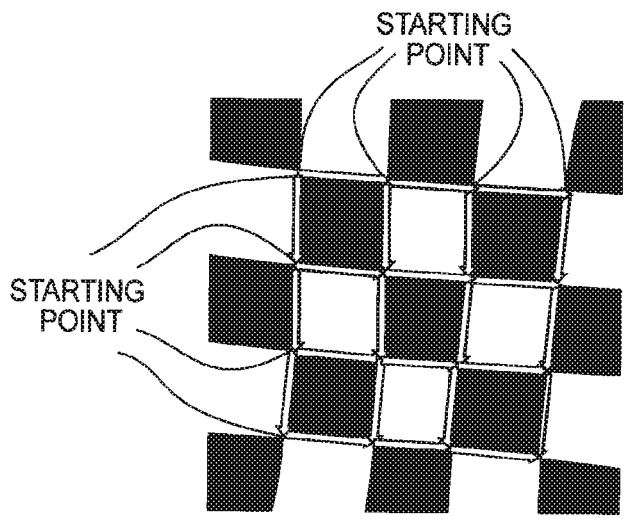
FIG. 15 is an explanatory diagram illustrating an example of a process of deciding linearity.

FIG. 15 is an explanatory diagram illustrating an example of a process of deciding the linearity. As illustrated in FIG. 15, attention is focused on the linearity in the vertical and horizontal directions with the chess grid points as starting points. First, the projection scheme selection means 42 generates a vector from a starting point to a grid point (a grid point vector). The projection scheme selection means 42 arbitrarily determines the reference grid point vectors in the vertical and horizontal directions respectively to calculate an inner product between the reference grid point vector and another grid point vector.

The projection scheme selection means 42 averages all inner products to quantify the linearity. The closer to 1 the numerical value is, the higher the linearity is. Therefore, the projection scheme selection means 42 selects the projection image having the above value closest to 1 out of the projection images transformed in the respective projection schemes to identify the projection scheme in which the selected projection image has been generated. The projection scheme selection means 42 then outputs an internal parameter of the fisheye-lens camera corresponding to the determined projection scheme.

In this manner, the projection scheme selection means 42 may determine the vector from each point as the starting point to an adjacent point by using the plurality of points for identifying the position of the straight line and may decide that the linearity is higher as the average of the inner product between the vector defined as a reference and another vector is closer to 1. Furthermore, the projection scheme selection means 42 may select a projection scheme having the above value closest to 1.

The ellipse estimation means 12, the perspective projection image generation means 13, the focal length calculation means 14, and the projection scheme selection means 42 are implemented by the CPU of a computer operating according to a program (a camera parameter estimation program). Incidentally, similarly to the first exemplary embodiment, the fisheye camera itself may function as a so-called intelligent camera and may include respective means included in the camera parameter estimation device 400. For example, the fisheye camera may include the image capturing device 41, the ellipse estimation device 12, the perspective projection image generation means 13, and the projection scheme selection means 42 (and, if necessary, the focal length calculation means 14, the perspective projection image size storage means 15, and the maximum incident angle storage means 16).

Figure 16:
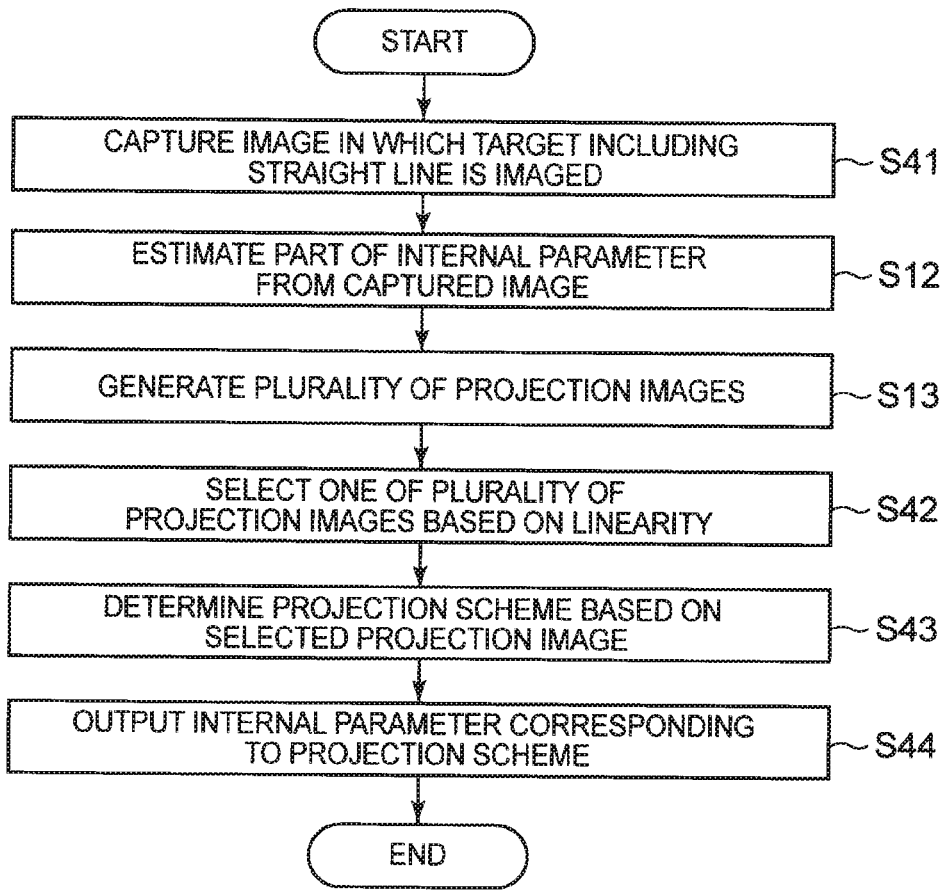
FIG. 16 is a flowchart illustrating an operation example of a camera parameter estimation device 400 of a fourth exemplary embodiment.

Subsequently, an operation example of the camera parameter estimation device 400 of this exemplary embodiment will be described. FIG. 16 is a flowchart illustrating an operation example of the camera parameter estimation device 400 of the fourth exemplary embodiment. The image capturing device 41 captures an image in which a target including a straight line is imaged by the fisheye-lens camera (step S41). Hereinafter, processes of steps S12 to S13 are performed to estimate the internal parameter and to generate a plurality of projection images.

The projection scheme selection means 42 selects one of the plurality of projection images on the basis of the linearity of each of the straight lines included in the projection images (step S42). The projection scheme selection means 42 determines a projection scheme on the basis of the selected projection image (step S43). The projection scheme selection means 42 then outputs an internal parameter of the fisheye-lens camera that corresponds to the determined projection scheme (step S44).

As described above, in this exemplary embodiment, the perspective projection image generation means 13 applies a plurality of projection schemes that use the radius of a visual field region of the fisheye-lens camera to an image in which a target including a straight line is imaged by the fisheye-lens camera to generate a plurality of projection images. The projection scheme selection means 42 selects one of the plurality of projection images on the basis of the linearity of each of the straight lines included in the projection images and determines a projection scheme on the basis of the selected projection image. The projection scheme selection means 42 then outputs an internal parameter of the fisheye-lens camera that corresponds to the determined projection scheme. Therefore, the internal parameter is able to be easily estimated without the need for a user's operation or prerequisite knowledge of a projection scheme.

Exemplary Embodiment 5

The following describes a fifth exemplary embodiment of the camera parameter estimation device according to the present invention. In the fourth exemplary embodiment, the linearity has been decided by using an image in which a target having a line in the image recognizable as a straight line is imaged. In this exemplary embodiment, description will be made on a method of determining a projection scheme by using an image of a target partially including a straight line such as a landscape image and then outputting an internal parameter.

Figure 17:
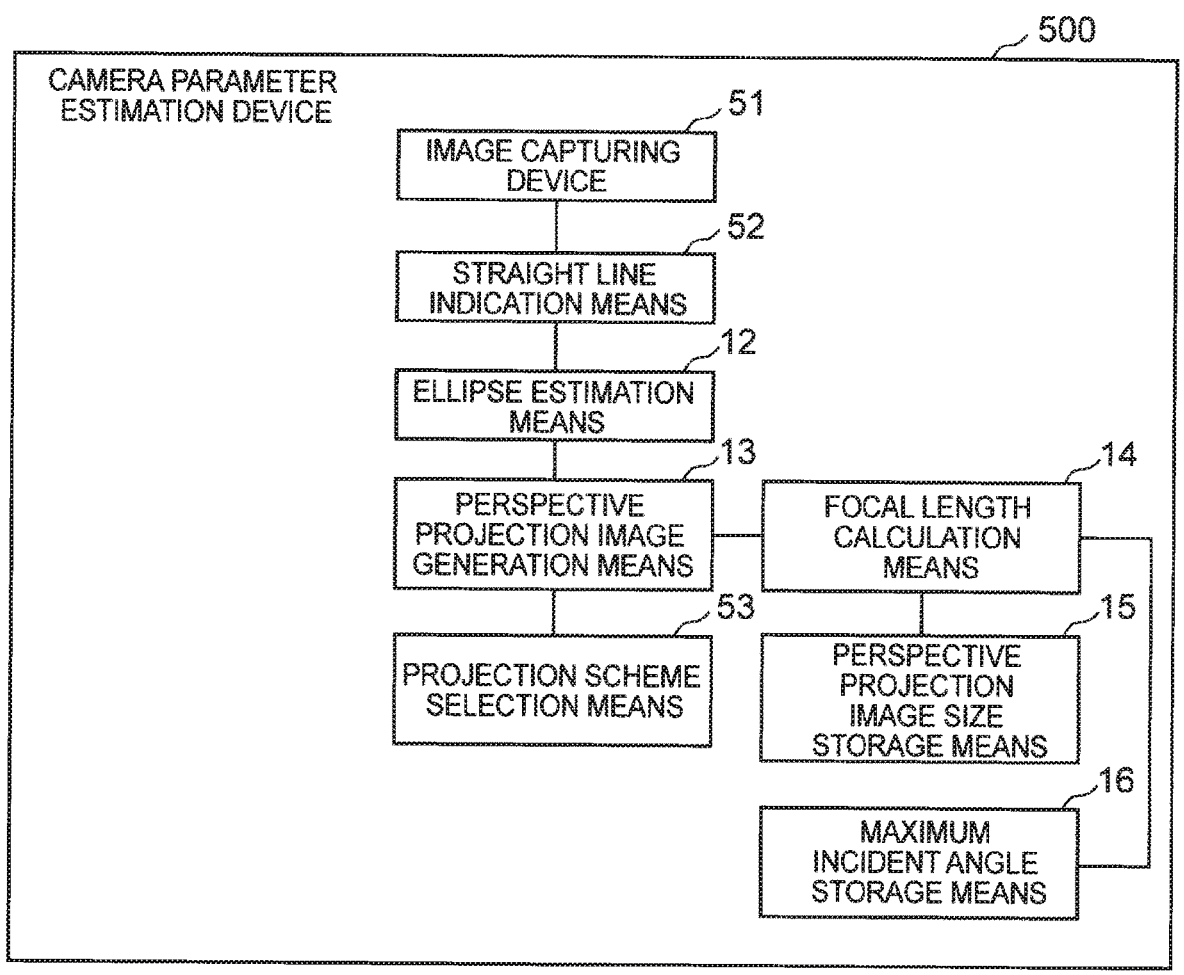
FIG. 17 is a block diagram illustrating a configuration example of a fifth exemplary embodiment of a camera parameter estimation device according to the present invention.

FIG. 17 is a block diagram illustrating a configuration example of the fifth exemplary embodiment of the camera parameter estimation device according to the present invention. A camera parameter estimation device 500 of this exemplary embodiment includes an image capturing device 51, a straight line indication means 52, an ellipse estimation means 12, a perspective projection image generation means 13, a focal length calculation means 14, a perspective projection image size storage means 15, a maximum incident angle storage means 16, and a projection scheme selection means 53.

In other words, the camera parameter estimation device of this exemplary embodiment differs in the contents of the image capturing device 51 and the projection scheme selection means 53 from the camera parameter estimation device of the fourth exemplary embodiment and further includes the straight line indication means 52, in comparison with the camera parameter estimation device of the fourth exemplary embodiment. Other components are the same as those of the fourth exemplary embodiment.

Similarly to the first exemplary embodiment, the image capturing device 51 captures an image in which a target at least partially including a straight line is imaged by a fisheye-lens camera. Incidentally, the image capturing device 51 may capture an image of a target in which the features characterizing the structure of the straight line can be automatically acquired from the image, like a planar chess pattern described in the fourth exemplary embodiment.

The straight line indication means 52 accepts an indicated portion decided as a straight line by a user from the image imaged by the fisheye-lens camera. In other words, in this exemplary embodiment, the indication of a target whose linearity is to be decided is accepted from the user before transformation to a perspective projection image.

The straight line indication means 52 may accept, from a user, the position of a line decided as a straight line with a plurality of points, for example. Moreover, the straight line indication means 52 may accept an indication identified by following a line to be decided as a straight line from the user.

FIG. 18 is an explanatory diagram illustrating an example of accepting an indicated portion decided as a straight line by the straight line indication means 52. As illustrated in FIG. 18(a), the straight line indication means 52 may accept the position of the line with a plurality of points P. Moreover, as illustrated in FIG. 18(b), the straight line indication means 52 may accept an indication for identifying the position of the line by following the line. If the position of the line is identified by following the line, the straight line indication means 52 may identify the position of the line with a plurality of points, considering that points are specified in positions where the line is divided at predetermined intervals (See FIG. 18(c)).

The straight line indication means 52 is implemented by an input-output device such as a touch panel or the like, for example. Furthermore, the straight line indication means 52 may be implemented by an output device such as a display device, a pointing device that identifies the position of the image output to the output device, or the like.

The projection scheme selection means 53 selects one of the plurality of projection images on the basis of the linearity of the straight line indicated by the portion accepted by the straight line indication means 52. Specifically, the perspective projection image generation means 13 also transforms the indicated position to a position in the projection image and therefore the projection scheme selection means 53 decides the linearity on the basis of the position.

The method of deciding the linearity is arbitrary. Similarly to the fourth exemplary embodiment, the projection scheme selection means 53 may generate a vector from each specified point to the next point and may calculate the average of the inner product between the respective vectors to decide the linearity.

The ellipse estimation means 12, the perspective projection image generation means 13, the focal length calculation means 14, and the projection scheme selection means 53 are implemented by the CPU of a computer operating according to a program (a camera parameter estimation program). Similarly to the fourth exemplary embodiment, the fisheye camera itself may function as a so-called intelligent camera and may include respective means included in the camera parameter estimation device 500.

Figure 19:
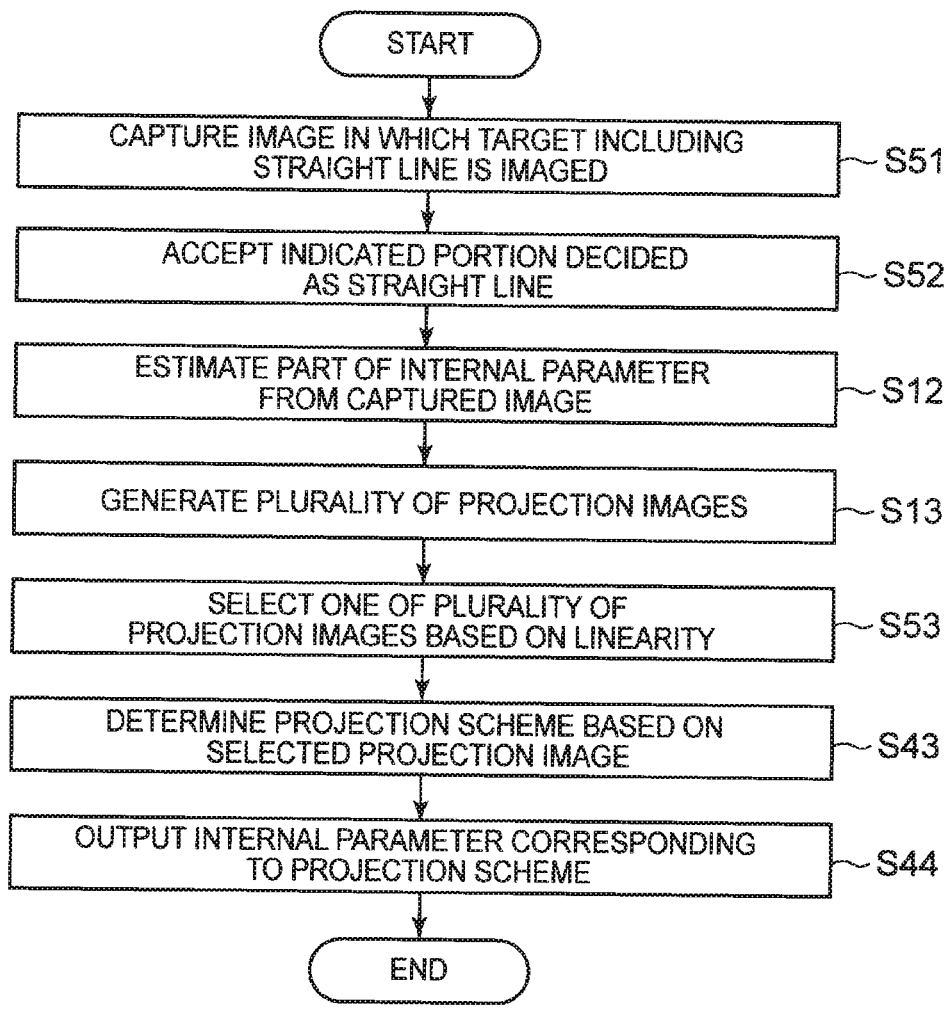
FIG. 19 is a flowchart illustrating an operation example of a camera parameter estimation device 500 of a fifth exemplary embodiment.

Subsequently, an operation example of the camera parameter estimation device 500 of this exemplary embodiment will be described. FIG. 19 is a flowchart illustrating the operation example of the camera parameter estimation device 500 of the fifth exemplary embodiment. The image capturing device 51 captures an image in which a target at least partially including a straight line is imaged by the fisheye-lens camera (step S51). The straight line indication means 52 accepts an indicated portion decided as a straight line by a user from the captured image (step S52). Thereafter, the processes of steps S12 to S13 for estimating an internal parameter and generating a plurality of projection images are performed.

The projection scheme selection means 53 selects one of the plurality of projection images on the basis of the linearity of the straight line indicated by the accepted portion (step S53). Thereafter, the processes of steps S43 to S44 for determining a projection scheme and outputting the internal parameter are performed.

As described above, in this exemplary embodiment, the straight line indication means 52 accepts an indicated portion decided as a straight line by a user from the image imaged by the fisheye-lens camera. The projection scheme selection means 53 then selects one of the plurality of projection images on the basis of the linearity of the straight line indicated by the accepted portion. Therefore, an internal parameter is able to be easily estimated without the need for a special image or prerequisite knowledge of a projection scheme.

Figure 20:
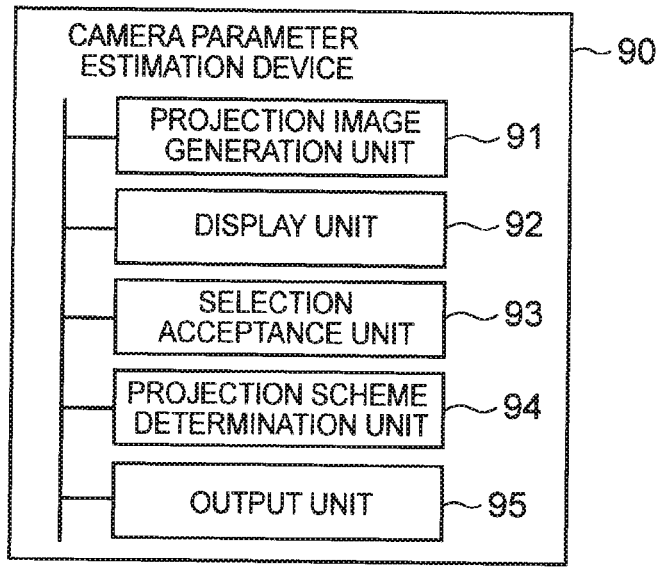
FIG. 20 is a block diagram illustrating an outline of a camera parameter estimation device according to the present invention.

Subsequently, an outline of the present invention will be described. FIG. 20 is a block diagram illustrating an outline of the camera parameter estimation device according to the present invention. A camera parameter estimation device 90 (for example, the camera parameter estimation device 100) according to the present invention includes: a projection image generation unit 91 (for example, the perspective projection image generation means 13) that applies a plurality of projection schemes that use the radius (for example, the radius R) of a visual field region of a fisheye-lens camera to an image that is imaged by the fisheye-lens camera to generate a plurality of projection images; a display unit 92 (for example, the perspective projection image display device 18) that displays the plurality of projection images; a selection acceptance unit 93 (for example, the projection scheme indication means 19) that accepts a projection image selected by a user from among the plurality of displayed projection images; a projection scheme determination unit 94 (for example, the projection scheme selection means 17) that determines a projection scheme on the basis of the selected projection image; and an output unit 95 (for example, the projection scheme selection means 17) that outputs an internal parameter of the fisheye-lens camera that corresponds to the determined projection scheme.

With this configuration, the internal parameter is able to be easily estimated without the need for prerequisite knowledge of a special calibration pattern or a projection scheme.

Moreover, the present invention enables estimation of the internal parameter without estimating an external parameter indicating the three-axis posture of a camera, a position from the ground thereof, or the like, as described in PTL 1.

Furthermore, the camera parameter estimation device 90 (for example, the camera parameter estimation device 200) may include a projection range input unit (for example, the perspective projection range input device 22) that accepts a range to generate projection image as an input out of the image imaged by the fisheye-lens camera and a maximum incident angle calculation unit (for example, the maximum incident angle calculation means 21) that calculates a maximum incident angle that corresponds to the range for each projection scheme. In addition, the projection image generation unit 91 may generate the projection image in the range determined according to the maximum incident angle for each projection scheme.

Specifically, the projection range input unit may accept an input of a range having a distance from the center of the image to a specified point as a radius.

In addition, the projection image generation unit 91 may generate a projection image projected on a plane at a focal length, which is determined according to the maximum incident angle.

Furthermore, the camera parameter estimation device 90 (for example, the camera parameter estimation device 300) may further include a guide generation and display unit (for example, the guide generation and display means 31) that generates a guide for guiding a straight line to a position for assisting in estimating the internal parameter for the image imaged by the fisheye-lens camera and displays the guide so as to be superimposed on the image.

Specifically, the guide generation and display unit may generate a guide indicating a circle at a predetermined distance from the center of the image or a radial guide from the center of the image and may display the guide so as to be superimposed on the image imaged by the fisheye-lens camera.

In addition, the guide generation and display unit may generate a guide having a predetermined length and may display the guide so as to be superimposed on the image imaged by the fisheye-lens camera.

Moreover, the camera parameter estimation device 90 may further include a visual field region estimation unit (for example, the ellipse estimation means 12) that estimates the radius of a visual field region of the fisheye-lens camera from the image imaged by the fisheye-lens camera (for example, estimates the radius by elliptical fitting).

Furthermore, the projection image generation unit 91 may apply, as projection schemes, two or more projection schemes of an equidistant projection scheme, an orthographic projection scheme, a stereographic projection scheme, and an equisolid angle projection scheme to generate a plurality of projection images.

Moreover, the output unit 95 may output, as the internal parameter of the fisheye-lens camera, the center of the image (for example, $(C_u, C_v)$), photographed by the fisheye-lens camera, a distortion (for example, $\alpha$) of an image sensor of the fisheye-lens camera, the radius (for example, R) of the visual field region, and a projection scheme.

Although a part or all of the above exemplary embodiments may be described as in the following supplementary notes, the present invention is not limited to the following.

(Supplementary note 1) A camera parameter estimation device including: a projection image generation unit that applies a plurality of projection schemes that use the radius of a visual field region of a fisheye-lens camera to an image that is imaged by the fisheye-lens camera to generate a plurality of projection images; a display unit that displays the plurality of projection images; a selection acceptance unit that accepts a projection image selected by a user from among the plurality of displayed projection images; a projection scheme determination unit that determines a projection scheme on the basis of the selected projection image; and an output unit that outputs an internal parameter of the fisheye-lens camera that corresponds to the determined projection scheme.

(Supplementary note 2) The camera parameter estimation device described in Supplementary note 1, further including a projection range input unit that accepts a range to generate projection image as an input out of the image imaged by the fisheye-lens camera; and a maximum incident angle calculation unit that calculates a maximum incident angle that corresponds to the range for each projection scheme, wherein the projection image generation unit generates the projection image in the range determined according to the maximum incident angle for each projection scheme.

(Supplementary note 3) The camera parameter estimation device described in Supplementary note 2, wherein the projection range input unit accepts an input of a range having a distance from the center of the image to a specified point as a radius.

(Supplementary note 4) The camera parameter estimation device described in Supplementary note 2 or 3, wherein the projection image generation unit generates a projection image projected on a plane at a focal length, which is determined according to the maximum incident angle.

(Supplementary note 5) The camera parameter estimation device described in any one of Supplementary notes 1 to 4, further including a guide generation and display unit that generates a guide for guiding a straight line to a position for assisting in estimating the internal parameter for the image imaged by the fisheye-lens camera and displays the guide so as to be superimposed on the image.

(Supplementary note 6) The camera parameter estimation device described in Supplementary note 5, wherein the guide generation and display unit generates a guide indicating a circle at a predetermined distance from the center of the image or a radial guide from the center of the image and displays the guide so as to be superimposed on the image imaged by the fisheye-lens camera.

(Supplementary note 7) The camera parameter estimation device described in Supplementary note 5 or 6, wherein the guide generation and display unit generates a guide having a predetermined length and displays the guide so as to be superimposed on the image imaged by the fisheye-lens camera.

(Supplementary note 8) The camera parameter estimation device described in any one of Supplementary notes 1 to 7, further including a visual field region estimation unit that estimates the radius of a visual field region of the fisheye-lens camera from the image imaged by the fisheye-lens camera.

(Supplementary note 9) The camera parameter estimation device described in any one of Supplementary notes 1 to 8, wherein the projection image generation unit applies, as projection schemes, two or more projection schemes of an equidistant projection scheme, an orthographic projection scheme, a stereographic projection scheme, and an equisolid angle projection scheme to generate a plurality of projection images.

(Supplementary note 10) The camera parameter estimation device described in any one of Supplementary notes 1 to 9, wherein the output unit outputs, as the internal parameter of the fisheye-lens camera, the center of the image photographed by the fisheye-lens camera, a distortion of an image sensor of the fisheye-lens camera, the radius of the visual field region, and a projection scheme.

(Supplementary note 11) A camera parameter estimation method including the steps of: applying a plurality of projection schemes that use the radius of a visual field region of a fisheye-lens camera to an image that is imaged by the fisheye-lens camera to generate a plurality of projection images; displaying the plurality of projection images: accepting a projection image selected by a user from among the plurality of displayed projection images; determining a projection scheme on the basis of the selected projection image; and outputting an internal parameter of the fisheye-lens camera that corresponds to the determined projection scheme.

(Supplementary note 12) The camera parameter estimation method described in Supplementary note 11 further including the steps of: accepting a range to generate projection image as an input out of the image imaged by the fisheye-lens camera; and calculating a maximum incident angle that corresponds to the range for each projection scheme; and generating the projection image in the range determined according to the calculated maximum incident angle for each projection scheme.

(Supplementary note 13) A camera parameter estimation program for causing a computer to perform: a projection image generation process of applying a plurality of projection schemes that use the radius of a visual field region of a fisheye-lens camera to an image that is imaged by the fisheye-lens camera to generate a plurality of projection images; a display process of displaying the plurality of projection images on a display device: a selection acceptance process of accepting a projection image selected by a user from among the plurality of displayed projection images; a projection scheme determination process of determining a projection scheme on the basis of the selected projection image; and an output process of outputting an internal parameter of the fisheye-lens camera that corresponds to the determined projection scheme.

(Supplementary note 14) The camera parameter estimation program described in Supplementary note 13, causing the computer to perform: a projection range input process of accepting a range to generate projection image as an input out of the image imaged by the fisheye-lens camera; and a maximum incident angle calculation process of calculating a maximum incident angle that corresponds to the range for each projection scheme, wherein the projection image generation process includes a process of causing the computer to generate the projection image in the range determined according to the maximum incident angle for each projection scheme.

REFERENCE SIGNS LIST 11, 41, 51 Image capturing device
12 Ellipse estimation means
13 Perspective projection image generation means
14 Focal length calculation means
15 Perspective projection image size storage means
16 Maximum incident angle storage means
17, 42, 53 Projection scheme selection means
18 Perspective projection image display device
19 Projection scheme indication means
21 Maximum incident angle calculation means
22 Perspective projection range input device
31 Guide generation and display means
52 Straight line indication means
100, 200, 300, 400, 500 Camera parameter estimation device

The invention claimed is:

1. A camera parameter estimation device comprising:
a hardware including a memory and a processor,
a projection image generation unit, implemented by the processor, that applies a plurality of projection schemes that use a radius of a visual field region of a fisheye-lens camera to an image of a target including a straight line in actual space imaged by the fisheye-lens camera to generate a plurality of projection images, each of the plurality of projection images being generated based on a different projection scheme, among the plurality of projection schemes;
a display unit that displays the plurality of projection images:
a selection acceptance unit, implemented by the processor, that accepts a projection image selected by a user from among the plurality of displayed projection images as having a highest linearity based on a linearity on the projection image of the straight line included in the target;
a projection scheme determination unit, implemented by the processor, that determines a projection scheme on the basis of the selected projection image; and
an output unit, implemented by the processor, that outputs an internal parameter of the fisheye-lens camera that corresponds to the determined projection scheme,
wherein the plurality of projection images displayed by the display unit is generated respectively by applying the plurality types of projection schemes, and
wherein the display unit displays the plurality of projection images side by side in a manner of capable of comparing the linearity of the straight line included in the target of each of the projection images.

2. The camera parameter estimation device according to claim 1, further comprising:
a projection range input unit, implemented by the processor, that accepts a range to generate projection image as an input out of the image imaged by the fisheye-lens camera; and
a maximum incident angle calculation unit, implemented by the processor, that calculates a maximum incident angle that corresponds to the range for each projection scheme,
wherein the projection image generation unit generates the projection image in the range determined according to the maximum incident angle for each projection scheme.

3. The camera parameter estimation device according to claim 2,
wherein the projection range input unit accepts an input of a range having a distance from the center of the image to a specified point as a radius.

4. The camera parameter estimation device according to claim 2,
wherein the projection image generation unit generates a projection image projected on a plane at a focal length, which is determined according to the maximum incident angle.

5. The camera parameter estimation device according to claim 1, further comprising a guide generation and display unit, implemented by the processor, that generates a guide for guiding a straight line to a position for assisting in estimating the internal parameter for the image imaged by the fisheye-lens camera and displays the guide so as to be superimposed on the image.

6. The camera parameter estimation device according to claim 5,
wherein the guide generation and display unit generates a guide indicating a circle at a predetermined distance from the center of the image or a radial guide from the center of the image and displays the guide so as to be superimposed on the image imaged by the fisheye-lens camera.

7. The camera parameter estimation device according to claim 5,
wherein the guide generation and display unit generates a guide having a predetermined length and displays the guide so as to be superimposed on the image imaged by the fisheye-lens camera.

8. The camera parameter estimation device according to claim 1, further comprising a visual field region estimation unit, implemented by the processor, that estimates the radius of a visual field region of the fisheye-lens camera from the image imaged by the fisheye-lens camera.

9. The camera parameter estimation device according to claim 1,
wherein the projection image generation unit applies, as projection schemes, two or more projection schemes of an equidistant projection scheme, an orthographic projection scheme, a stereographic projection scheme, and an equisolid angle projection scheme to generate a plurality of projection images.

10. The camera parameter estimation device according to claim 1,
wherein the output unit outputs, as the internal parameter of the fisheye-lens camera, the center of the image photographed by the fisheye-lens camera, a distortion of an image sensor of the fisheye-lens camera, the radius of the visual field region, and a projection scheme.

11. The camera parameter estimation device according to claim 1, wherein the display unit is further configured to display a list of the plurality of projection images generated by applying the plurality types of projection schemes to one image.

12. The camera parameter estimation device according to claim 1,
wherein the display unit displays the plurality of projection images at the same time.

13. A camera parameter estimation method comprising:
applying a plurality of projection schemes that use a radius of a visual field region of a fisheye-lens camera to an image of a target including a straight line in actual space by the fisheye-lens camera to generate a plurality of projection images, each of the plurality of projection images being generated based on a different projection scheme, among the plurality of projection schemes;
displaying the plurality of projection images:
accepting a projection image selected by a user from among the plurality of displayed projection images as having a highest linearity based on a linearity on the projection image of the straight line included in the target;
determining a projection scheme on the basis of the selected projection image; and
outputting an internal parameter of the fisheye-lens camera that corresponds to the determined projection scheme,
wherein the displayed plurality of projection images is generated respectively by applying the plurality types of projection schemes, and
wherein the plurality of projection images are displayed side by side in a manner of capable of comparing the linearity of the straight line included in the target of each of the projection images.

14. The camera parameter estimation method according to claim 13 further comprising:
accepting a range to generate projection image as an input out of the image imaged by the fisheye-lens camera; and
calculating a maximum incident angle that corresponds to the range for each projection scheme; and
generating the projection image in the range determined according to the calculated maximum incident angle for each projection scheme.

15. A non-transitory computer readable information recording medium storing a camera parameter estimation program, when executed by a processor, that performs a method for:
applying a plurality of projection schemes that use a radius of a visual field region of a fisheye-lens camera to an image of a target including a straight line in actual space imaged by the fisheye-lens camera to generate a plurality of projection images, each of the plurality of projection images being generated based on a different projection scheme, among the plurality of projection schemes;
displaying the plurality of projection images on a display device;
accepting a projection image selected by a user from among the plurality of displayed projection images as having a highest linearity based on a linearity on the projection image of the straight line included in the target;
determining a projection scheme on the basis of the selected projection image; and
outputting an internal parameter of the fisheye-lens camera that corresponds to the determined projection scheme,
wherein the displayed plurality of projection images is generated respectively by applying the plurality types of projection schemes, and
wherein the plurality of projection images are displayed side by side in a manner of capable of comparing the linearity of the straight line included in the target of each of the projection images.

16. The non-transitory computer readable information recording medium according to claim 15 further comprising:
accepting a range to generate projection image as an input out of the image imaged by the fisheye-lens camera; and
calculating a maximum incident angle that corresponds to the range for each projection scheme; and
generating the projection image in the range determined according to the calculated maximum incident angle for each projection scheme.

* * * * *